(12) United States Patent
Ali et al.

(10) Patent No.: US 10,102,502 B2
(45) Date of Patent: Oct. 16, 2018

(54) METHOD AND SYSTEM FOR SOURCE TRACKING

(75) Inventors: Syed Mohammed Ali, Sunnyvale, CA (US); Adam Hyder, Los Altos, CA (US); Kam Wing Chu, Burlingame, CA (US); Changsheng Chen, Castro Valley, CA (US)

(73) Assignee: Jobvite, Inc., Burlingame, CA (US)

( * ) Notice: Subject to any disclaimer, the term of this patent is extended or adjusted under 35 U.S.C. 154(b) by 495 days.

(21) Appl. No.: 13/599,215

(22) Filed: Aug. 30, 2012

(65) Prior Publication Data

US 2013/0054483 A1 Feb. 28, 2013

Related U.S. Application Data

(60) Provisional application No. 61/529,826, filed on Aug. 31, 2011.

(51) Int. Cl.
*G06Q 10/10* (2012.01)

(52) U.S. Cl.
CPC .............................. *G06Q 10/1053* (2013.01)

(58) Field of Classification Search
CPC ........................... G06Q 10/1053; G06Q 50/01
See application file for complete search history.

(56) References Cited

U.S. PATENT DOCUMENTS

| | | | |
|---|---|---|---|
| 5,826,022 A | 10/1998 | Nielsen | |
| 5,937,162 A | 8/1999 | Funk et al. | |
| 6,141,666 A | 10/2000 | Tobin | |
| 6,163,802 A | 12/2000 | Lin et al. | |
| 6,192,396 B1 | 2/2001 | Kohler | |
| 6,381,592 B1 | 4/2002 | Reuning | |

(Continued)

FOREIGN PATENT DOCUMENTS

| | | |
|---|---|---|
| CA | 1318036 C | 5/1993 |
| WO | WO 2007092358 A2 * | 8/2007 |

OTHER PUBLICATIONS

SocializedHR(TM) and ResuReader(TM) to be featured as 'awesome new technologies' at HR technology conference. Sep. 21, 2010. PR Newswire Retrieved from https://dialog.proquest.com/professional/docview/752963277?accountid=142257.*

(Continued)

*Primary Examiner* — Gabrielle A McCormick
*Assistant Examiner* — Maame Ofori-Awuah
(74) *Attorney, Agent, or Firm* — Chamberlain Hrdlicka, White, Williams & Aughtry

(57) ABSTRACT

A method for tracking referrals using a third party applicant tracking system (ATS). The method include receiving a request to display a web page at a URL from a client used by a job candidate, where the URL is associated with a job at a company and the job candidate. The method further includes providing to the client a web page associated with the URL that includes a description of the job and a link to an ATS, receiving a request for a web page corresponding to the job, where the request is initiated by selection of the link. The method further includes making a determination that the ATS is a third party ATS and, in response, generating a third party referral URL, a unique identifier associated with the job, and an identifier associated with a source type, and providing the third party referral URL to the client.

12 Claims, 19 Drawing Sheets

(56) References Cited

U.S. PATENT DOCUMENTS

| | | | |
|---|---|---|---|
| 6,385,620 B1 | 5/2002 | Kurzius et al. | |
| 6,449,765 B1 | 9/2002 | Ballard | |
| 6,618,747 B1 | 9/2003 | Flynn et al. | |
| 6,662,194 B1 | 12/2003 | Joao | |
| 6,721,784 B1 | 4/2004 | Leonard et al. | |
| 6,968,313 B1 | 11/2005 | Oran | |
| 6,976,056 B1 | 12/2005 | Kumar | |
| 7,158,986 B1 | 1/2007 | Oliver et al. | |
| 7,310,626 B2 | 12/2007 | Scarborough et al. | |
| 7,558,795 B2 | 7/2009 | Malik et al. | |
| 7,617,176 B2 | 11/2009 | Zeng et al. | |
| 7,774,229 B1 | 8/2010 | Dernehl et al. | |
| 8,001,057 B1 | 8/2011 | Hill | |
| 2005/0216295 A1* | 9/2005 | Abrahamsohn | 705/1 |
| 2005/0261965 A1 | 11/2005 | Eisen et al. | |
| 2006/0042483 A1 | 3/2006 | Work et al. | |
| 2006/0224721 A1 | 10/2006 | Rowe et al. | |
| 2006/0224729 A1* | 10/2006 | Rowe et al. | 709/224 |
| 2006/0242014 A1 | 10/2006 | Marshall et al. | |
| 2006/0253315 A1 | 11/2006 | Ramsey et al. | |
| 2006/0265267 A1 | 11/2006 | Chen et al. | |
| 2007/0011340 A1* | 1/2007 | Seidl | G06F 17/3089 709/228 |
| 2007/0043603 A1 | 2/2007 | Andersen et al. | |
| 2008/0147736 A1* | 6/2008 | Dane et al. | 707/104.1 |
| 2008/0172415 A1 | 7/2008 | Fakhari et al. | |
| 2009/0299993 A1 | 12/2009 | Novack | |
| 2010/0036712 A1 | 2/2010 | Abrahamsohn | |
| 2010/0131418 A1 | 5/2010 | McCagg et al. | |
| 2010/0191589 A1 | 7/2010 | Matte | |
| 2011/0022528 A1 | 1/2011 | Hennessy | |
| 2011/0112976 A1 | 5/2011 | Ryan et al. | |
| 2011/0196802 A1 | 8/2011 | Ellis et al. | |
| 2011/0258016 A1* | 10/2011 | Barak | G06Q 30/02 705/7.29 |
| 2011/0276376 A1 | 11/2011 | Schmitt | |
| 2012/0095931 A1* | 4/2012 | Gurion et al. | 705/319 |

OTHER PUBLICATIONS

C.E McCollister, Ensuring electronic mail system delivery capability, IEEE Military Communications, vol. 1, 1999 (5 pages).
R-coupon brochure, "Generating and Harvesting Goodwill by Enhancing Word of Mouth Marketing" (2 pages).
R-coupon brochure, "Harvesting Goodwill through Relationship Referral Marketing" (5 pages).
Web Archive, "Recommend.it.com" Jun. 10, 1988 (4 pages).
Dialog file 636 #03631982 entitled "Argos Business Solutions: customer referral scheme encourages sale of mobile phones" M1 press wire, PNA, Jul. 8, 1997 (2 pages) .
Tutton, Nikole; "Social Media and Recruiting a Diverse Workforce—Can you have both???," http://www.recruitingblogs.com/profiles/blogs/social-media-and-recruiting-a?xg_source=activity; Jun. 16, 2010; pp. 1-4.
Vicknair, J., Elkersh, D., Yancey, K, and Budden, N.C; "The Use of Social Networking Websites as a Recruiting Tool for Employers;" American Journal of Business Education; Nov. 2010; cluteonline.com; pp. 7-12.
http://web.jobvite.com/rs/jobvite/images/Jobvite%202010%20Social%20Recruiting%20Report_2.pdf; 2010; pp. 1-15.
Bartlett, B., Gui, L., Gulland, S., Grehan, J., Kuncik, A., Medoff, S., Profto, C., Schiff, S., Silva Cano, G.; "Revitalizing Military Recruitment Without Restoring the Draft;" May 12, 2009, 265 pages.
Fernandez, R.M., and Sosa, M.L; "Gendering the Job: Networks and Recruitment at a Call Center" American Journal of Sociology, 2005; 49 pages.

* cited by examiner

From: Jim Smith [notification@jobvite.com]
Sent: Wednesday, April 01, 2011 1:29 PM
To: Mary Mclean
Subject: Jobvite is looking for a Sr. Software Engineer - UI I thought you'd be interested in this job at Jobvite or know someone who might be a good match.

Learn more or Jobvite a friend
Jim Smith >> mary_mclean@gmail.com

Sr. Software Engineer - UI
Develop next generation web 2.0 platform using Open Source, AJAX, HTML, CSS, REST, JQuery or YUI or Dojo or EXTJS Jobvite

FIG. 4A adamhyder Adam Hyder
Jobvite is looking for: Software Engineer - UI http://jobvite.com/m?3M1E5fwg #job
23 hours ago

METHOD AND SYSTEM FOR SOURCE TRACKING

CROSS-REFERENCE TO RELATED APPLICATIONS

This application claims priority, pursuant to 35 U.S.C. § 119(e), to the filing date of Provisional U.S. Patent Application Ser. No. 61/529,826, entitled "METHOD AND SYSTEM FOR SOURCE TRACKING," filed on Aug. 31, 2011, which is hereby incorporated by reference in its entirety.

The present application contains subject matter that may be related to the subject matter in U.S. patent application Ser. No. 13/168,665 and U.S. patent application Ser. No. 13/198,316. U.S. patent application Ser. No. 13/168,665 and U.S. patent application Ser. No. 13/198,316 are incorporated by reference in their entirety in the instant application.

BACKGROUND

When companies are looking to hire a new employee for a job, they encourage their employees and third parties (e.g., recruiters) to tell people they know to apply for the job. Companies often use a referral bonus as an incentive for this behavior. However, when an individual applies for a job, the company must rely on ad hoc systems to determine who referred the individual so that the company can pay the referral bonus to the appropriate employee or third party. This is a non-trivial process as companies are typically not able to track how and by whom the job was referred to the individual who applied for the job.

SUMMARY

In general, in one aspect, the invention relates to a method, the method including receiving a first request to display a first web page at a first URL from a first client system, where the first client system is used by a first target, where the first URL is associated with a first job at a first company, the first target, and a first communication channel, and where the first target is a job candidate, providing to the first client system, in response to the first request, the first web page associated with the first URL, where the first web page comprises a description of the first job, and a first link to a first applicant tracking system (ATS), receiving, from the first client system, a request for a web page corresponding to the first job from the first ATS, wherein the request is initiated by selection of the first link, making a first determination that the first ATS is a third party ATS, and in response to the first determination: generating a third party referral URL, where the third party referral URL comprises a first domain name associated with the first ATS, a first unique identifier associated with the first job, an identifier associated with the first communication channel, a first identifier associated with a first source type, where the first source type identifies a referral entity that informed the first target about the first job, and providing the third party referral URL to the first client system.

In general, in one aspect, the invention relates to a system. The system include a referral tracking service configured to receive a request to display a web page at a URL from a client system, wherein the client system is used by a target, wherein the URL is associated with a job at a company, the target, and a communication channel, and wherein the target is a job candidate, provide to the client system, in response to the request, the web page associated with the URL, wherein the web page comprises a description of the job, and a link to an applicant tracking system (ATS), receive, from the client system, a request for a web page corresponding to the job from the ATS, wherein the request is initiated by selection of the link, make a determination that the ATS is a third party ATS, and in response to the determination, send a request to a URL generation service to generate a third party referral URL. The system further includes the URL generation service configured to receive the request to generate the third party referral URL, generate the third party referral URL, wherein the third party referral URL comprises a domain name associated with the ATS, a unique identifier associated with the job, an identifier associated with the communication channel, an identifier associated with a source type, wherein the source type identifies a referral entity that informed the target about the job, and provide the third party referral URL to client system. The system further includes a data transfer service configured to obtain applicant data from the ATS, wherein the applicant data comprises data entered by the target during a job application process for the job by the target and data entered by the company during the application process for the job by the target, transmit the applicant data to a database, and the database comprising applicant data, wherein the database is accessible to the referral tracking service, the URL referral service, and the data transfer service.

BRIEF DESCRIPTION OF DRAWINGS

FIGS. 4A-4C show example screenshots in accordance with one or more embodiments of the invention.

DETAILED DESCRIPTION

Figure 1A:
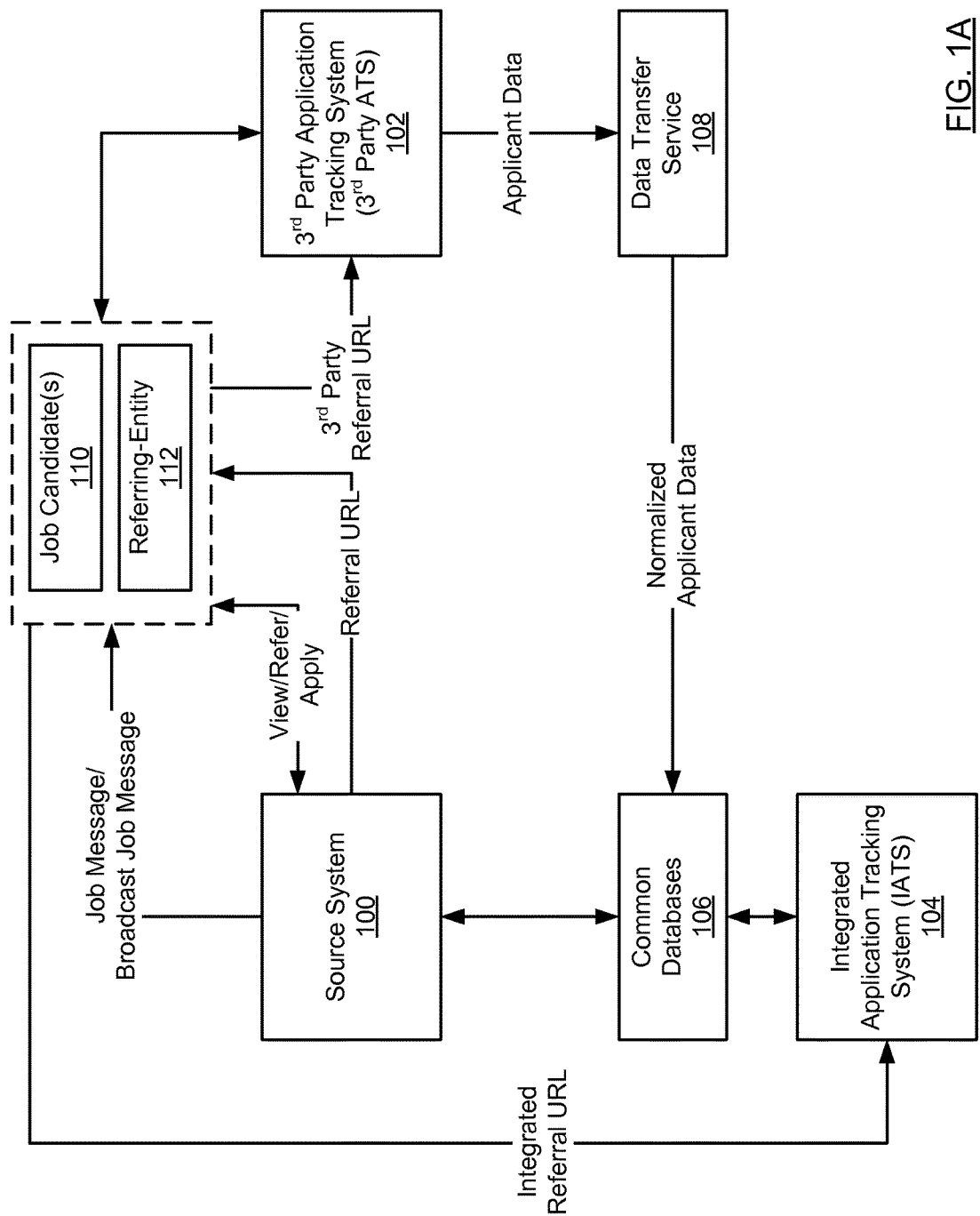
FIGS. 1A-1B show systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for source tracking More specifically, embodiments of the invention relate to tracking job referral across sourcing systems and applicant tracking systems. One or more embodiments of the invention enable the transfer to source tracking information from a sourcing system to one or more applicant tracking systems. Further, embodiments of the invention enable the transfer of applicant data from applicant tracking systems to one or more source systems.

FIG. 1A shows a system in accordance with one or more embodiments of the invention. The system includes a source system (100), one or more third party applicant tracking systems (ATSs) (102), one or more integrated ATSs (104), one or more data transfer services (108), job candidates (110), and referral entities (112). Each of these components is described below.

In one embodiment of the invention, the source system (100) corresponds to one or more computer systems that include software and/or hardware to perform one or more of the following: (i) identify job candidates and/or referral entities, (ii) communicate job messages and broadcast job messages to the job candidates and/or referral entities, (iii) tracking how jobs are referred between job candidates and/or referral entities, (iv) generate referral universal resource locators (URLs) to ATSs (102, 104); and (v) receive applicant data from ATSs (102, 104). In one embodiment of the invention, the source system (100) (or components therein) include functionality to perform the methods shown in FIGS. 3A-3C (described below).

In one embodiment of the invention, an ATS (102, 104) corresponds to one or more computer systems configured to track a job candidate through the job application process. More specifically, the ATS (102, 104) may track which job candidates applied for which jobs, how far the job candidate progressed in each job application process, and how the company that was offering the job rated the job candidate. In one embodiment of the invention, the information tracked or otherwise stored by the ATS (102, 104) is collectively referred to as applicant data.

Returning to the discussion of FIG. 1A, in one embodiment of the invention, an integrated ATS (104) corresponds to an ATS that shares the same database(s) (106) (or various portions thereof) with the source system (100). Said another way, information obtained by the source system (100) is stored in a database(s) (106) that is accessible to the integrated ATS (104) and information obtained by the integrated ATS is stored in a database(s) (typically the same database(s)) that is accessible to the source system (100). The source system (100) may use the information obtained by the integrated ATS (104) to identify job candidates. In one embodiment of the invention, the source system (100) includes functionality to use the applicant data obtained from the ATS (102, 104) to perform the methods shown in FIGS. 3A-3D in U.S. patent application Ser. No. 13/198, 316, which is hereby incorporated by reference in its entirety. In one embodiment of the invention, the integrated ATS (104) may use the information obtained by the source system to determine the source of the job candidate (i.e., how the job candidate found out about the job).

Continuing with the discussion of FIG. 1A, the third party ATS (102) includes the same functionality as the integrated ATS described above. However, the third party ATS (102) does not share a database(s) (106) with the source system (100). In such cases, the source system (100) may pass certain information (discussed below) to the third party ATS (104). Further, the source system (100) may obtain applicant data from the third party ATS (102) via a data transfer service (108). Details about the database(s) (106) are included in FIG. 1B and FIGS. 2A-2L below. In one embodiment of the invention, the source system (100) includes functionality to use the applicant data obtained from the third party integrated ATS (102) to perform the methods shown in FIGS. 3A-3D in U.S. patent application Ser. No. 13/198,316.

In one embodiment of the invention, the data transfer service (108) is a web service configured to obtain applicant data from the third party ATS (102), normalize the applicant data, and provide the normalized applicant data to the database(s) (106) used by the source system (100). In one embodiment of the invention, the data transfer service (108) is implemented using well known web service architectures. In one embodiment of the invention, there may be one data transfer service for each third party ATS (102), one data transfer service for multiple third party ATSs (102), or one data transfer service for all third party ATSs (102).

In one embodiment of the invention, a job candidate (110) may be any individual that receives a job message or broadcast job message, who is qualified to apply for the job. In one embodiment of the invention, a referral entity (112) is any individual that receives a job message or broadcast job message for a job and then forwards the job (via a job message or broadcast job message) to another user. The individual that receives a job message or broadcast job message from a referral entity may be a job candidate, a referral entity, or both. Those skilled in the art will appreciate that a single individual may act as both a job candidate and a referral-entity for a particular job. Further, those skilled in the art will appreciate that a single individual may act as a job candidate for particular jobs and a referral entity for other jobs.

Examples of referral entities may include, but are not limited to, recruiters hired by the company offering the job, employees of the company offering the job, individuals in a user's social network (i.e., the social network of the individual who is creating the original job message/broadcast job message or the social network of the individual who has received a job message/broadcast job message for a job and is forwarding), or any other individual that creates a job message/broadcast job message.

In one embodiment of the invention, jobs are communicated to job candidates and/or referral entities via job messages or broadcast job messages. In one embodiment of the invention, each job message specifies a job and is associated with a sender, a recipient, and a communication channel (described in FIG. 1B). The job messages are used to directly communicate the job between individual users. In one embodiment of the invention, each broadcast job message specifies a job, a sender, and a communication channel (described in FIG. 1B). The broadcast job messages are used to communicate the job concurrently to a group of individuals.

Those skilled in the art will appreciate that the invention is not limited to the implementation shown in FIG. 1A. In particular, the various components in FIG. 1A may be omitted, combined or otherwise re-configured without departing from the invention.

Figure 1B:
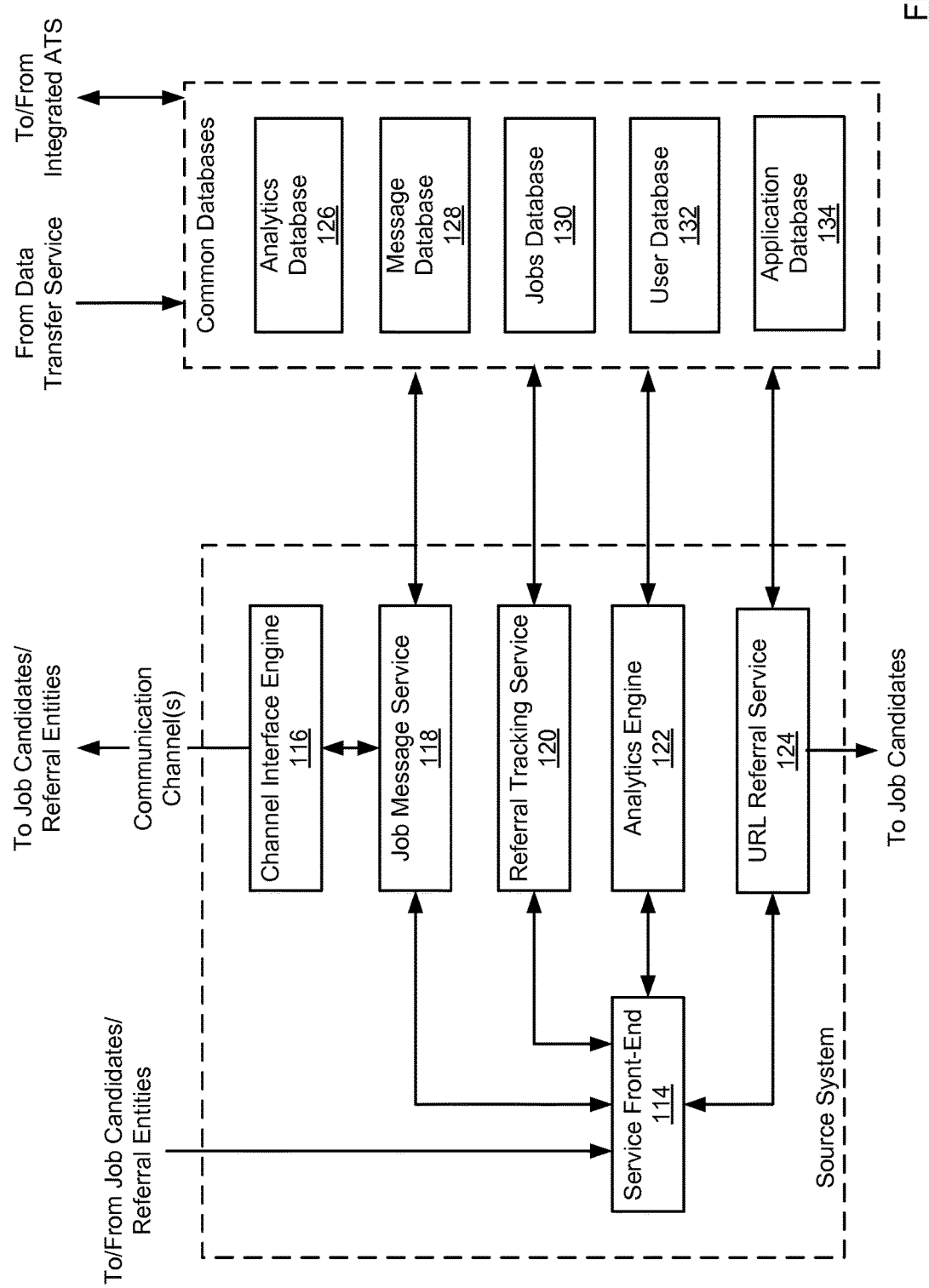

FIG. 1B shows a source system (100) and common databases (106) in accordance with one or more embodiments of the invention. As shown in FIG. 1B, the source system a service front-end (114), a channel interface engine (116), a job message service (118), referral tracking service (120), an analytics engine (122), and a URL referral service (124). Further, the common databases (106) include an analytics database, (126), a message database (128), a jobs database (130), a user database (132), and an application database (134). Each of these components is described below.

In one embodiment of the invention, the service front-end (114) includes functionality to interface with job candidates and referral entities via one or more client systems (not shown). In one embodiment of the invention, a client system corresponds to a remote system configured to interface with the service front-end (114). The client system may be a mobile device (e.g., smart phone tablet computer, laptop, etc.) or any non-mobile computer device (e.g., desktop, etc.)

with functionality to enable the job candidate and/or referral entity to interface with the service front-end (114). Such functionality may include, but is not limited to, a web browser or standalone application along with hardware and/or software necessary to communicate with the service front-end.

In one embodiment of the invention, the service front-end is implemented as a web-server configured to serve web pages to the client system and to receive input from the client system via the client's web browser and/or a standalone application on the client system. In one embodiment of the invention, if the client system is executing a web browser to interface with the service front-end, then the service front-end includes the web pages to send to the client system(s). Upon receipt of input from the client system, the service front-end is configured to extract and, if necessary, modify the input prior to sending the input to one or more services shown in FIG. 1B (described below). Similarly, upon receipt of data from one or more services shown in FIG. 1B, the service front-end is configured to perform the required formatting of such data, prior to sending the formatted data to the client system(s). In one embodiment of the invention, the service front-end may interact with multiple client systems simultaneously.

In one embodiment of the invention, the referral tracking service (120) is configured to track how job messages and broadcast job messages are propagated over the various communication channels. In one embodiment of the invention the job message service (118) is configured to create job messages and broadcast job messages. Once created, the job message service forwards the job messages and/or broadcast job messages to the channel interface engine (116). In one embodiment of the invention the channel interface engine (116) includes functionality to send or otherwise communicate the job message or broadcast job message on the communication channel specified in the job message or broadcast job message. In one embodiment of the invention, a communication channel refers to any service and/or social network that supports the communication of job messages and/or broadcast job messages to job candidates (110 in FIG. 1A) or referral entities (112 in FIG. 1A). Examples of services include, but are not limited to, electronic mail (e-mail), short message service (SMS), TWITTER, Craigslist, and blogs. Examples of social networks include, but are not limited to, FACEBOOK, LINKEDIN, MYSPACE, TWITTER, and GOOGLE+. In one embodiment of the invention, communication channels used to communicate job messages may be referred to as direct communication channels. Examples of direct communication channels may include, but are not limited to, e-mail, LINKEDIN InMail, TWITTER messages (also referred to as direct messages), and SMS. In one embodiment of the invention, communication channels that are used to communicate broadcast job messages may be referred to as broadcast communication channels. Examples of broadcast communication channels may include, but are not limited to, a blog, CRAIGSLIST, a FACEBOOK status update, a LINKEDIN update, a TWITTER status update, a FACEBOOK wall post, and a LINKEDIN group post. TWITTER is a registered trademark of Twitter, Inc. of California, U.S.A. FACEBOOK is a registered trademark of Facebook, Inc. of California, U.S.A. MYSPACE is a registered trademark of MySpace, Inc. of California, U.S.A. LINKEDIN is a registered trademark of LinkedIn, Inc. of California, U.S.A. CRAIGSLIST is a registered trademark of Craigslist, Inc. of California, U.S.A. GOOGLE+ is a trademark of Google, Inc. of California, U.S.A.

In one embodiment of the invention, the URL referral service (124) is configured to generate referral URLs, namely, third party referral URLs and integrated referral URLs. In one embodiment of the invention, third party referral URLs are used to redirect job candidates to third party ATSs and integrated referral URLs are used to redirect job candidates to the integrated ATS. Additional details about the URL referral service are described in FIG. 3C below.

In one embodiment of the invention the analytics engine (122) includes functionality to analyze the records in the common database to determine, for example, the source of a given job applicant (i.e., who should get credit for referring the job applicant), the job referral path for a given job applicant (i.e., the chain of job messages and/or broadcast job messages from the original sender to the job applicant), and effectiveness of the various communication channels used to communicate with job candidates and/or referral entities. In one embodiment of the invention, an analytics database (126) is configured to store the results generated by the analytics engine.

In one embodiment of the invention, the application database (134) includes application records (206). The content of the application records is described below in FIG. 2H. In one embodiment of the invention, the job database (130) includes job records (204). The contents of these records is described below in FIG. 2D. In one embodiment of the invention, the user database (132) includes user records (210), profile records (214), education records (216), work history records (218), and skills records (220). The contents of these records are described below in FIGS. 2B, 2I-2L. In one embodiment of the invention the message database (128) includes job message records (200), message records (202), broadcast job message records (212), and message view records (208). The contents of these records are described below in FIGS. 2C, 2E-2G.

In one embodiment of the invention, the databases (106) may be implemented using any persistent data storage device and/or technology including, but not limited to, magnetic storage, and solid state storage. Further, those skilled in the art will appreciate that the invention is not limited to the implementation shown in FIG. 1B. In particular, the various components in FIG. 1B may be omitted, combined or otherwise re-configured without departing from the invention.

Figure 2A:
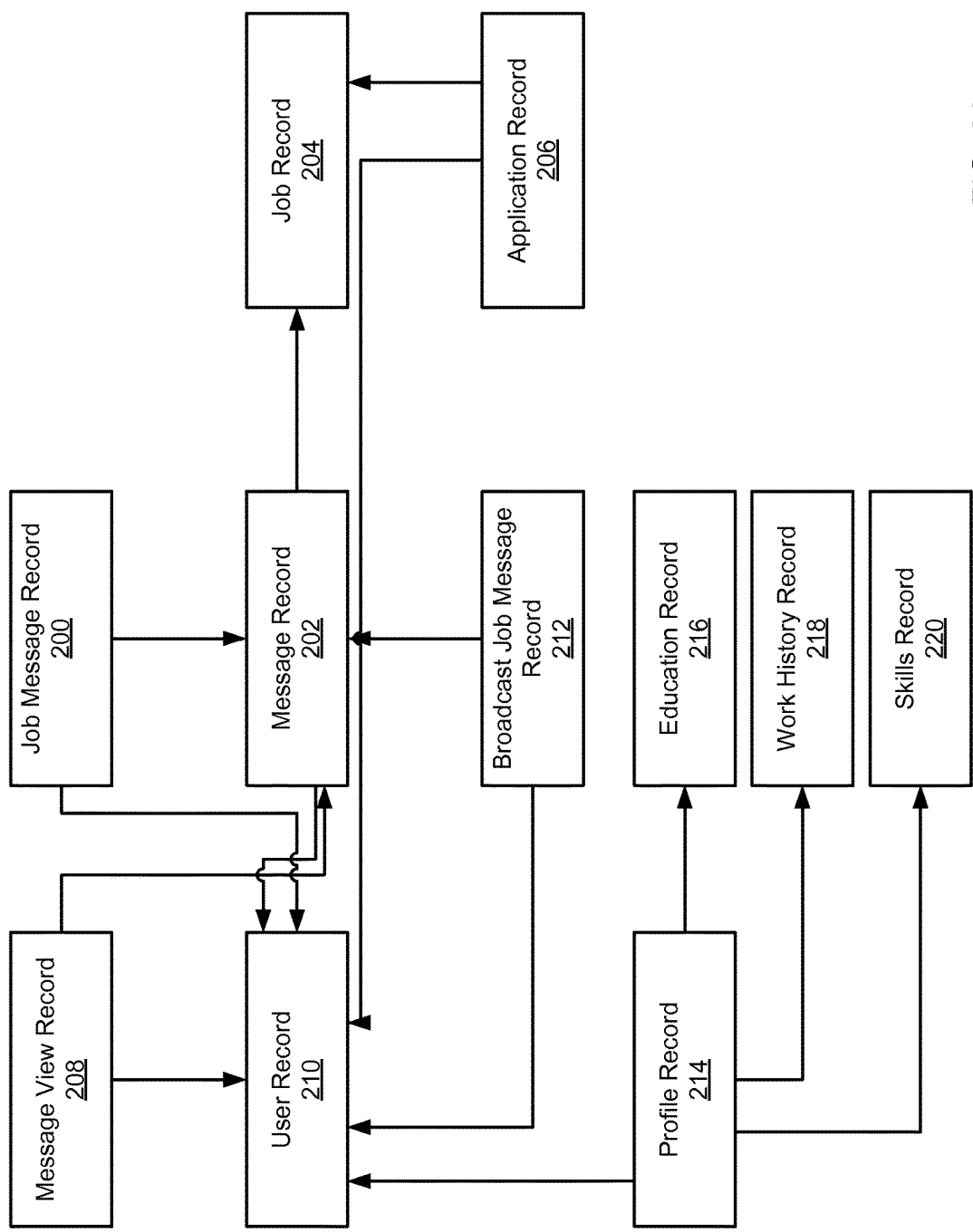
FIGS. 2A-2L show data structures in accordance with one or more embodiments of the invention.

FIGS. 2A-2I show data structures in accordance with one or more embodiments of the invention. FIG. 2A shows the relationship between the various records in accordance with one or more embodiments of the invention. As shown in FIG. 2A, each user is associated with a user record (210). Further, each user record (210) is associated with a profile record (214). The profile record (214) is further associated with one or more education records (216), one or more work history records (218), and one or more skills records (220). In addition, each user record (210) is associated with one or more application records (206). Each application record (206) is associated with one job record (204).

In addition, each job message is associated with a job message record (200) and each broadcast job message is associated with a broadcast job message record (212). Each job message record (200) is associated with a message record (202) and two user records (210) (i.e., a sender and a target) and each broadcast job message record (212) is associated with a message record (202) and a single user record (210) (i.e., a sender). Each message record (202) is associated with a single user record (210) and a job record (204). Finally, each message view record (208) is associated with a single user record (210) and a single message record (202). In one embodiment of the invention, the various records are associated with each other using the corresponding record IDs. The content of each of these records is discussed below.

Figure 2C:
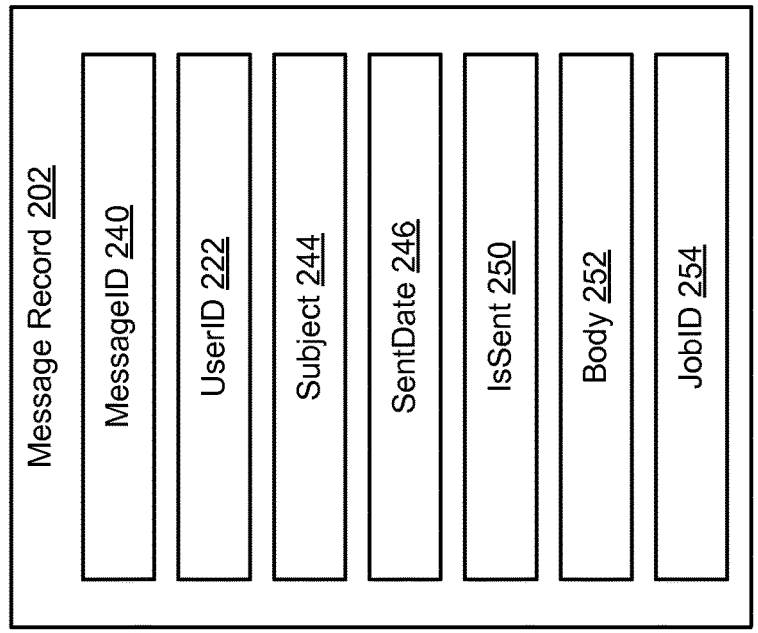
Figure 2B:
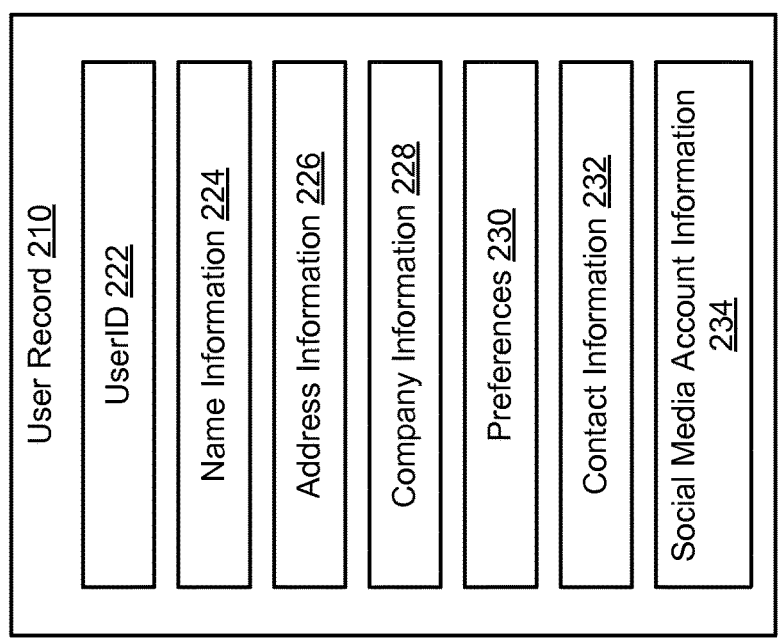

FIG. 2B shows a user record (210) in accordance with one or more embodiments of the invention. Each user record is associated with an individual. The individual may be a job candidate and/or a referral entity. Each user record (210) may include one or more of the following fields: (i) UserID (222) configured to store a unique numeric, alpha, or alphanumeric value to uniquely identify the user within the system; (ii) name information (224) configured to store the name of the user; (iii) address information (226) configured to store the current physical address of the user; (iv) company information (228) configured to store the company at which the user is currently employed; (v) preferences (230) configured to store various user preferences related to how the user prefers to interact with the various portions of the system (e.g., the user prefers to receive job messages and/or broadcast job messages over e-mail, etc.); (vi) contact information (232) configured to store the user's contact information, e.g., e-mail address(es), phone number, etc.; and (vii) social media account information (234) configured to store social media account information for the user, e.g., FACEBOOK username and password, TWITTER handle, etc. Those skilled in the art will appreciate that in any given user record (210) one or more of the aforementioned fields may not be completed.

FIG. 2C shows a message record (202) in accordance with one or more embodiments of the invention. Each message record (202) corresponds to a unique message associated with a user and job. Each message record (202) may include one or more of the following fields: (i) MessageID (240) configured to store a unique numeric, alpha, or alphanumeric value to uniquely identify the message within the system; (ii) UserID (222) configured to store the UserID of the user which sent the message; (iii) Subject (244) configured to store the subject line of the message (e.g., subject line of an e-mail); (iv) SentDate (246) configured to store the date the message was sent; (v) isSent configured to store a Boolean value to indicate whether the message was sent; (vi) Body (252) configured to store the body/content of the message; and (vii) JobID (254) configured to store the JobID of the job that is associated with the message (see FIG. 2D for additional detail). Those skilled in the art will appreciate that in any given message record (202) one or more of the aforementioned fields may not be completed.

Figure 2D:
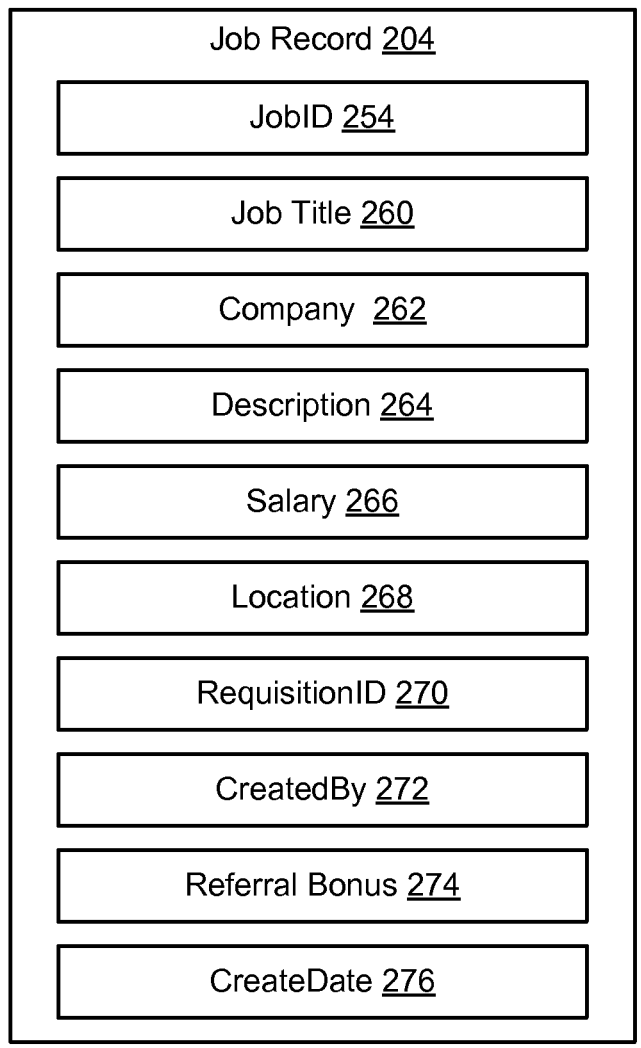

FIG. 2D shows a job record (204) is accordance with one or more embodiments of the invention. Each the job record (204) uniquely identifies a job within the system. Each job record (204) may include one or more of the following fields: (i) JobID (254) configured to store a unique numeric, alpha, or alphanumeric value to uniquely identify the job within the system; (ii) JobTitle (260) configured to store the title of the job; (iii) Company (262) configured to store the company that is offering the job; (iv) Description (264) configured to store the description of the job; (v) Salary (266) configured to store the salary of the job; (vi) Location (268) configured to store the location of the job, e.g., the city, state, and/country in which the job is located; (vii) RequisitionID (270) configured to store a numeric, alpha, or alphanumeric value to uniquely identify the job from the perspective of the company offering the job; (viii) CreatedBy (272) configured to store the UserID of the user that created the job record (206); (ix) Referral Bonus (274) configured to store whether there is a referral bonus associated with the job and/or the amount of the referral bonus; and (x) CreateDate (276) configured to store the date on which the job record was created. Those skilled in the art will appreciate that in any given job record (204) one or more of the aforementioned fields may not be completed.

Figures 2E, 2F:
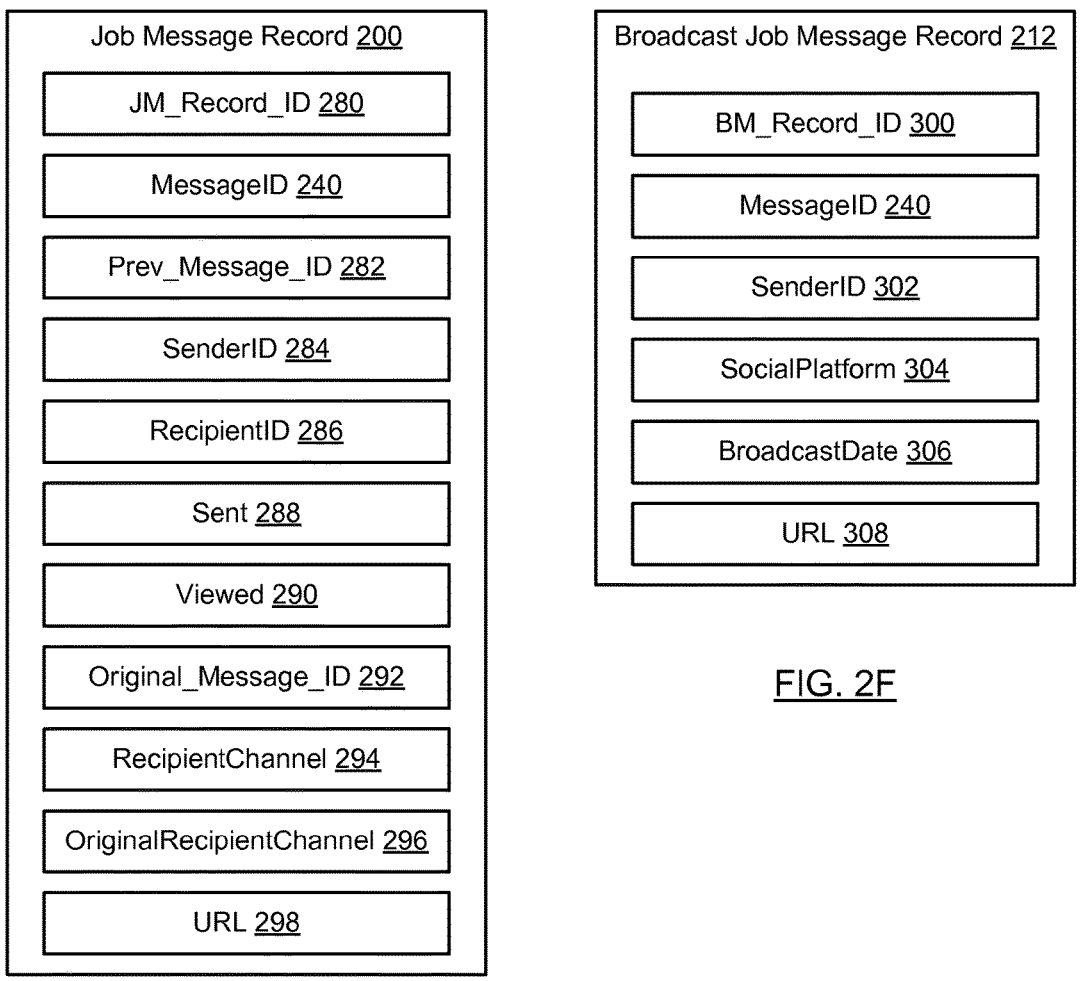

FIG. 2E shows a job message record (200) is accordance with one or more embodiments of the invention. Each job message record is associated with a job message. Each job message is uniquely associated with a job (via a message record), a sender, a recipient, and a communication channel. Each job message record (200) may include one or more of the following fields: (i) JM_Record_ID (280) configured to a unique numeric, alpha, or alphanumeric value to uniquely identify the job message record within the system; (ii) MessageID (240) configured to store the messageID corresponding to the message that is being sent with the job message; (iii) Prev_Message_ID (282) configured to store the message ID of the previously sent message within the job referral path; (iv) senderID (284) the UserID of the user that is sending the job message; (v) RecipientID (286) the UserID of the user that is the intended recipient of the job message; (vi) Sent (288) configured to store a timestamp of when the job message was sent; (vii) Viewed (290) configured to store when the website specified in the URL (298) was requested; (viii) Original_Message_ID (292) configured to store the message ID of the original message within the job referral path (see FIGS. 6A-6B for additional details); (ix) RecipientChannel (294) configured to store the communication channel (e.g., e-mail) over which the job message is to be communicated to the recipient; (x) OriginalRecipientChannel (296) configured to store the original communication channel over which the original job message within the job referral path was communicated to the original recipient; and (xi) URL (298) configured to store a URL that is uniquely associated with the job message (as defined by the job message record). Those skilled in the art will appreciate that in any given job message record (200) one or more of the aforementioned fields may not be completed.

FIG. 2F shows a broadcast job message record (212) in accordance with one or more embodiments of the invention. Each broadcast job message record is associated with a broadcast job message. Each broadcast job message is uniquely associated with a job (via a message record), a sender, and a communication channel. Each broadcast job message record (212) may include one or more of the following fields: (i) BM_Record_ID (300) configured to store a unique numeric, alpha, or alphanumeric value to uniquely identify the broadcast job message record within the system; (ii) a MessageID (240) configured to store the messageID corresponding to the message that is being sent with the broadcast job message; (iii) SenderID (302) configured to store the userID of the user that is sending the broadcast job message; (iv) SocialPlatform (304) is configured to store the identify of the social network and/or broadcast communication channel over which the broadcast job message is sent; (v) BroadcastDate (306) is the date on which broadcast job message was sent; and (vi) URL (308) configured to store a URL that is uniquely associated with the broadcast job message (as defined by the broadcast job message record). Those skilled in the art will appreciate that in any given broadcast job message record (212) one or more of the aforementioned fields may not be completed.

Figure 2G:
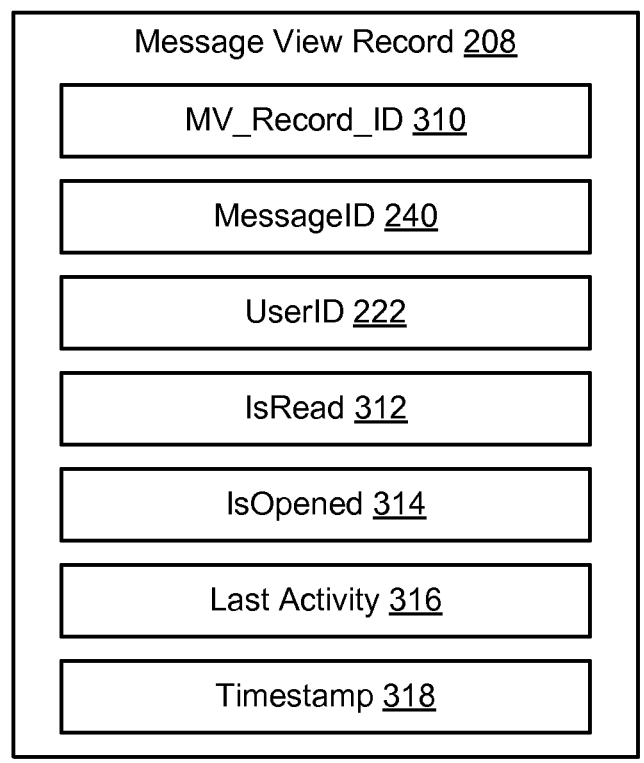

FIG. 2G shows a message view record (208) is accordance with one or more embodiments of the invention. The message view records (208) are configured to track a user's interaction with a job message or a broadcast job message. Each message view record (208) is uniquely associated with a job message and user. Accordingly, if a user receives a job message and a broadcast job message for the same job and the user viewed both the job message and the broadcast job message, there would be two message view records. Each message view record (208) may include one or more of the following fields: (i) MV_Record_ID (310) configured to store a unique numeric, alpha, or alphanumeric value to uniquely identify the message view record within the system; (ii) MessageID (240) configured to store the messageID corresponding to the message being viewed; (iii) UserID (222) configured to store the userID of the user that viewed the message; (iv) IsRead (312) a Boolean value configured to indicate whether the user read the message; (v) IsOpened (314) a Boolean value configured to indicate whether the user opened the message; (vi) Last Activity (316) configured to store the last activity the user performed on the message (e.g., opened, read, forwarded, apply for job, etc.); and (vii) Timestamp (318) configured to store the timestamp of the last activity. Those skilled in the art will appreciate that in any given message view record (208) one or more of the aforementioned fields may not be completed.

Figure 2H:
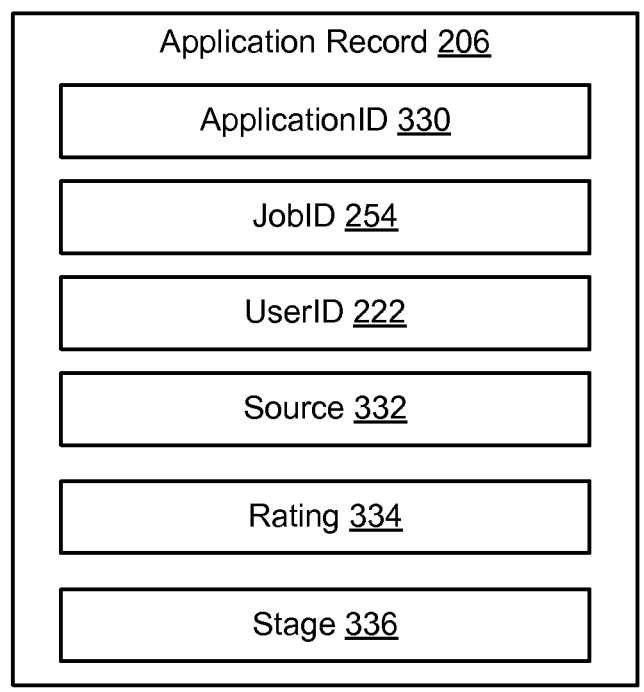

FIG. 2H shows an application record (206) in accordance with one or more embodiments of the invention. Each application record (206) uniquely identifies a job application within the system. Each application record (206) may include one or more of the following fields: (i) ApplicationID (330) configured to store a unique numeric, alpha, or alphanumeric value to uniquely identify the job application within the system; (ii) JobID (254) configured to store a unique numeric, alpha, or alphanumeric value to uniquely identify the job within the system, where the JobID identifies the job that is associated with the application record; (iii) UserID (222) configured to store a unique numeric, alpha, or alphanumeric value to uniquely identify the user within the system, where the userID identifies the user that applied for the job (corresponding to the JobID); (iv) source (332) configured to store information about the referral entity that referred the job to the user (as identified by the UserID) or the social network over which a broadcast job message was communicated to the user, where the user applied for the job via a URL in the broadcast job message; (v) rating (334) configured to store a rating by one or more individuals at the company who have reviewed the user's resume or have interacted with the user (e.g., during an interview); and (vi) stage (336) configured to store the job application stage that the user has reached during the job application process for the job (identified via the JobID).

In one embodiment of the invention, the rating (334) specifies one or more of the following: (i) not rated; (ii) not qualified; (iii) under qualified; (iv) maybe; (v) good; (vi) preferred; (vii) over qualified; or (viii) not interested. Those skilled in the art will appreciate that other rating schemes may be used and that the invention is not limited to the aforementioned rating scheme. In one embodiment of the invention, the stage (336) may specify one or more of the following: (i) applied and not interviewed, (ii) phone interview and no match, (iii) in-person interview and no match, (iv) offer declined, and (v) hired. Those skilled in the art will appreciate that other schemes may be used to describe the various job application stages and that the invention is not limited to the aforementioned scheme.

Figure 2J:
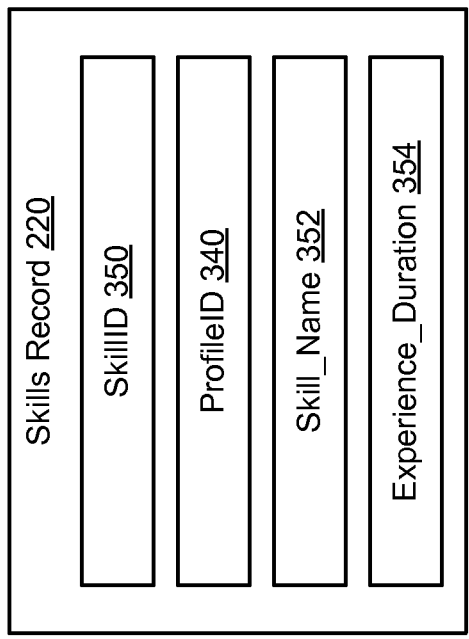
Figure 2I:
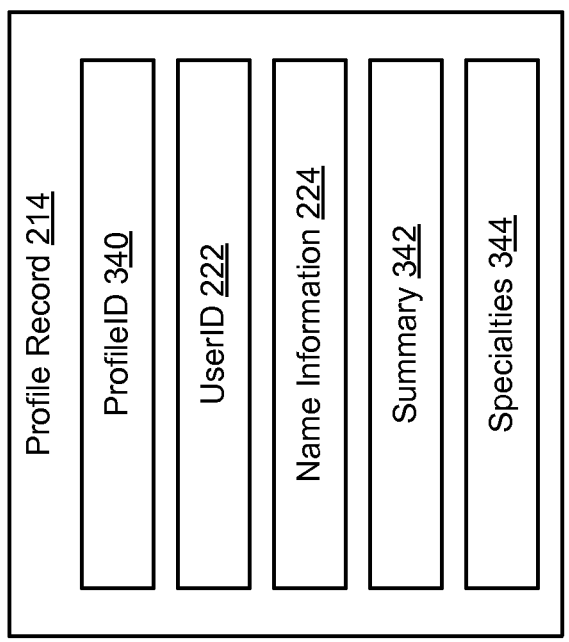

FIG. 2I shows a profile record (214) in accordance with one or more embodiments of the invention. Each profile record (214) is associated with a user record (210). Each profile record (214) may include one or more of the following fields: (i) ProfileID (340) configured to store a unique numeric, alpha, or alphanumeric value to uniquely identify the profile record within the system; (ii) UserID (222) configured to store a unique numeric, alpha, or alphanumeric value to uniquely identify the user within the system; (iii) name information (224) configured to store the name of the user; (iv) summary (342) configured to store a summary of the user's education, skills, etc, where the user corresponds to the user identified in User ID (222); and (v) specialties (344) configured to store keywords used to describe the user's expertise in one or more areas. Those skilled in the art will appreciate that in any profile record one or more of the aforementioned fields may not be completed.

FIG. 2J shows a skills record (220) in accordance with one or more embodiments of the invention. Each skills record is associated with a profile record (214). Each skills record (220) may include one or more of the following fields: (i) SkillID (350) configured to store a unique numeric, alpha, or alphanumeric value to uniquely identify the skills record within the system; (ii) ProfileID (340) configured to store a unique numeric, alpha, or alphanumeric value to uniquely identify the profile record within the system; (iii) Skill_Name (352) configured to store the name (or description) of the skill; and (iv) Experience_Duration (354) configured to store the length of time that the user (i.e., the user associated with the profile record) had the skill. Those skilled in the art will appreciate that in any skill record one or more of the aforementioned fields may not be completed.

Figure 2L:
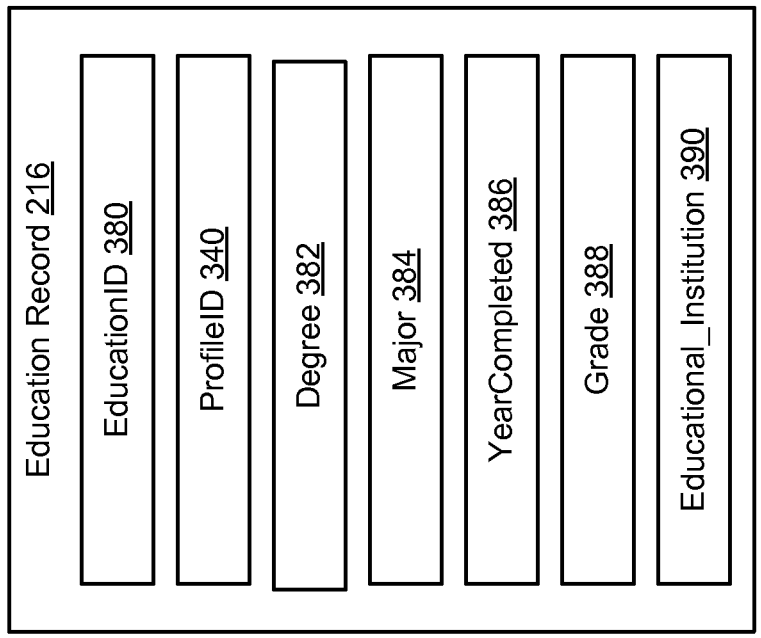
Figure 2K:
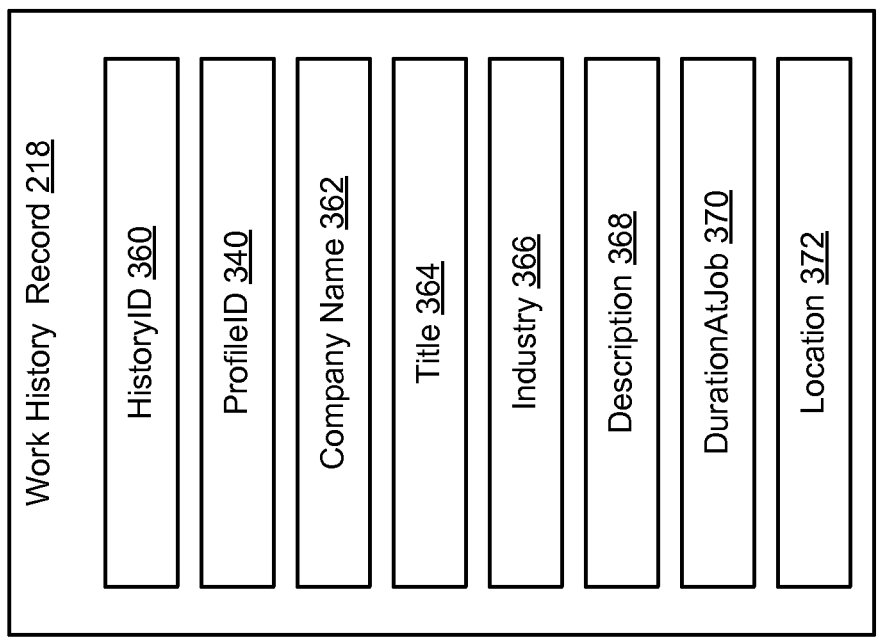

FIG. 2K shows a work history record (218) in accordance with one or more embodiments of the invention. Each work history record is associated with a profile record (214). Each work history record (218) may include one or more of the following fields: (i) HistoryID (360) configured to store a unique numeric, alpha, or alphanumeric value to uniquely identify the work history record within the system; (ii) ProfileID (340) configured to store a unique numeric, alpha, or alphanumeric value to uniquely identify the profile record within the system; (iii) CompanyName (362) configured to store the company name at which the user (identified via the profileID) currently works or has previously worked); (iv) Title (364) configured to store the job title the user held at the company; (v) Industry (366) configured to store the industry in which the company operates; (vi) Description (368) configured to store a description of the job (i.e., the job identified by the title (364)), where the description may include the more detailed information about job responsibilities, etc.; (vii) DurationAtJob (370) configured to store the length of time the user (identified via the ProfileID) was at the job (i.e., the job identified by the title (364)); and (viii) Location (372) configured to store the geographic location of the job (i.e., the job identified by the title (364)). Those skilled in the art will appreciate that in any work history record one or more of the aforementioned fields may not be completed.

FIG. 2L shows an education record (216) in accordance with one or more embodiments of the invention. Each education record is associated with a profile record (214). Each education record (216) may include one or more of the following fields: (i) EducationID (380) configured to store a unique numeric, alpha, or alphanumeric value to uniquely identify the education record within the system; (ii) ProfileID (340) configured to store a unique numeric, alpha, or alphanumeric value to uniquely identify the profile record within the system; (iii) Degree (382) configured to store the degree that the user (identified via the ProfileID) has obtained, e.g., Bachelor's degree, Master's degree, doctorate, etc.); (vi) Major (384) configured to store information about the primary area of study for which degree was obtained; (v) YearCompleted (386) configured to store the year in which the degree was conferred; (vi) Grade (388) configured to store the grade point average (GPA) or other grade information for the degree; and (vii) Educational_Institution (390) configured to store the college, university, etc. which the conferred to degree to the user. Those skilled in the art will appreciate that in any education record one or more of the aforementioned fields may not be completed.

FIGS. 3A-3D show flowcharts in accordance with one or more embodiments of the invention. While the various steps in the following flowcharts are presented and described sequentially, one of ordinary skill will appreciate that some or all of the steps may be executed in different orders, may be combined, or omitted, and some or all of the steps may be executed in parallel.

Figure 3A:
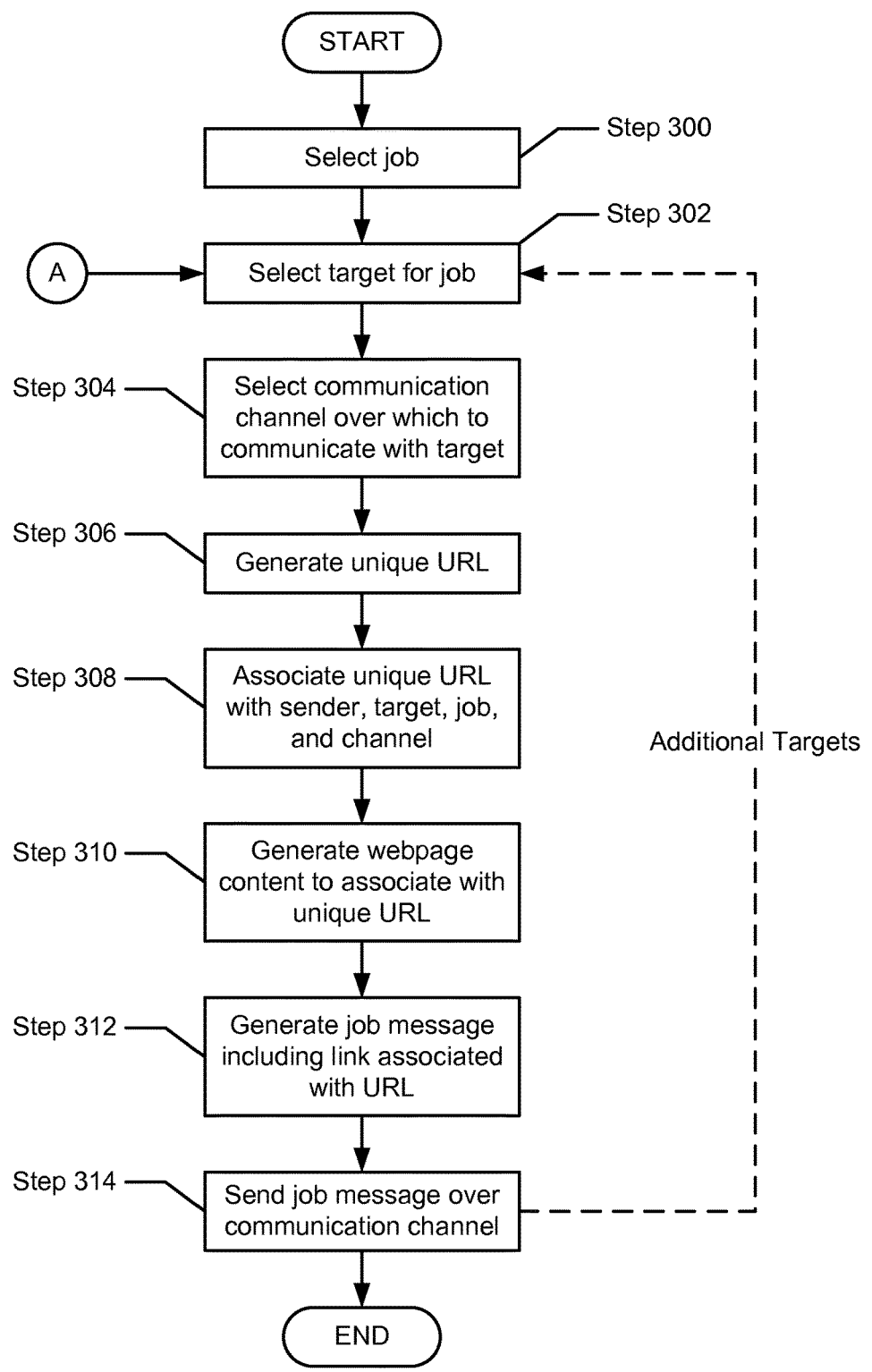
FIGS. 3A-3D show flowcharts in accordance with one or more embodiments of the invention.

FIG. 3A shows a method for sending a job message or a broadcast job message in accordance with one or more embodiments of the invention. In one embodiment of the invention, the job message service is configured to performed one or more of the steps shown in FIG. 3A. Turning to FIG. 3A, in step 300 a user (i.e., that user the creates the initial job message or broadcast job message in the job referral path) selects a job. Those skilled in the art will appreciate that the job may be selected from a previously populated list of jobs (with corresponding job records (discussed above)) or that the user may create a new job (by creating a corresponding job record) and then select the new job.

In step 302, the target for the job is selected. In one embodiment of the invention, the user selects a job candidate, a referral-entity, or a group of job candidates or referral-entities (e.g., all individuals following the user's TWITTER feed, all graduates of a particular university, all individuals with a particular skill set living in a particular area, etc.).

In one embodiment of the invention, the job message service is configured to provide recommendations of targets to the user. In one embodiment of the invention, the job message service may recommend an employee of the company that is offering the job as a target. Such a recommendation may be based on, for example, (i) employee's past activities with respect to forwarding job messages/broadcast job messages, e.g., employee has previously forwarded job messages/broadcast job messages they have received, employee has previously forwarded job messages/broadcast job message to job candidates that have applied for the job; (ii) employee's social network, e.g., employee has large social network, employee has social network with job candidates that are a good match for the job, etc.; and (iii) employee's relationship to a job candidate, e.g., went to the same university (or other educational institution), job candidate is in social network of the employee, etc. Those skilled in the art will appreciate that the employee recommendation, as described above, is used to identify employees that can act as referral entities.

In one embodiment of the invention, the job message service may recommend a recruiter. Such a recommendation may be based on, for example, (i) recruiter's past activities with respect to forwarding job messages/broadcast job messages, e.g., recruiter has previously forwarded job messages/broadcast job messages they have received, recruiter has previously forwarded job messages/broadcast job message to job candidates that have applied for the job; (ii) recruiter's social network, e.g., recruiter has large social network, recruiter has social network with job candidates that are a good match for the job, etc.; and (iii) recruiter's relationship to a job candidate, e.g., went to the same university (or other educational institution), job candidate is in social network of the employee, etc. Those skilled in the art will appreciate that the recruiter recommendation, as described above, is used to identify recruiters that can act as referral entities.

In one embodiment of the invention, the user may also receive a recommendation based on their own social network contacts (e.g., FACEBOOK friends, LINKEDIN connections, TWITTER followers, TWITTER feeds user is following, GOOGLE+ contacts, etc.). Such a recommendation may be based on, for example, (i) social network contact's past activities with respect to forwarding job messages/broadcast job messages, e.g., social network contact has previously forwarded job messages/broadcast job messages they have received, social network contact has previously forwarded job messages/broadcast job message to job candidates that have applied for the job; (ii) size of social network contact's social network; (iii) social network contact's relationship to a job candidate, e.g., went to the same university (or other educational institution), job candidate is in social network of the employee, etc; (iv) social network contact being a good match for the job based on the location of the job; (v) social network contact being a good match for the job based on the title of the job and the social network contact's current job title; and/or (vii) social network contact being a good match for the job based on the job description and the social network contact's current skill set (as determined using, for example, social network contact's profile on one or more social networks).

In one embodiment of the invention, the user may also receive recommendations for a given job candidate based on how the job candidate performed in the job application process of a similar job. In this embodiment, information in the application record(s) and the job record(s) may be used to identify similar jobs to the job identified in Step 300 as well as how the job candidate performed in the job application process for the similar job.

In one embodiment of the invention, the user may receive recommendations for job candidates based on information about the job candidates in the profile records, education records, work history records, and skills records. In particular, the characteristics of the job (for example obtained from the corresponding job record) may be used to identify potential job candidates in the user database.

Those skilled in the art will appreciate that recommendations of employees and/or social network contacts in step 302 may be based on information obtained from one or more of the databases shown in FIG. 1B. Further, those skilled in the art will appreciate that a service other than the job message service may be configured to provide recommendations of the targets to the user without departing from the invention.

Continuing with FIG. 3A, in step 304, the communication channel over which to communicate the job message (corresponding to the job) is selected. If the target is a job candidate or a referral entity, then communication channel may be a direct communication channel. If the target is a group of job candidates or referral-entities, then the communication channel may be a broadcast communication channel. In one embodiment of the invention, the source system (or, more specifically, a process therein) recommends a particular communication channel(s) over which to send the job message/broadcast job message to the target. The user may then select a communication channel based on the recommendation. Those skilled in the art will appreciate that the user does not necessarily need to follow the recommendation and, in such cases, may select any communication channel of her choosing. In another embodiment of the invention, the source system (or, more specifically, a process therein) automatically selects the particular communication channels(s) over which to send the job message/broadcast job message to the target.

In step 306, a unique URL is generated. In step 308, the URL generated in step 306 is associated with a sender (i.e., the user that is sending the job message), the job (as defined in the corresponding job record), and the communication channel. Further, if the job is sent in a job message (as opposed to broadcast job message), then the URL is also associated with the target.

In step 310, a web page for the job is generated. In one embodiment of the invention, the content for the web page is at least, in part, obtained from the corresponding job record. In one embodiment of the invention, the web page includes an apply link that a job candidate may select to apply for the job. When the URL associated with the apply link is selected, the source system may perform the method shown in FIG. 3C. Continuing with FIG. 3A, the website is then associated with the URL generated in Step 306.

In step 312, the job message or broadcast job message is generated (depending on the target selected in Step 302 and/or the communication channel selected in Step 304). In one embodiment of the invention, generating the job message includes generating the corresponding records (as described in FIGS. 2A-2L). For example, when a job message is generated, then a corresponding message record and job message record are also generated (typically prior to the generation of the job message). Similarly, when a broadcast job message is generated, then a corresponding message record and broadcast job message record are also generated (typically prior to the generation of the job message). Those skilled in the art will appreciate other records associated with the job message and or broadcast job message record may also be generated prior to generation of the job message or broadcast job message. Such records include the user record(s) and the job records.

Continuing with FIG. 3A, in step 314, the job message or the broadcast job message is sent over the communication channel selected in Step 304. Those skilled in the art will appreciate that Steps 302-314 may be repeated if the user wishes to send a job message or job broadcast message to different job candidates, referral-entities, or groups of job candidates or referral-entities.

In one embodiment of the invention, when a job message or broadcast job message for a job is sent to a target, job messages and/or broadcast job messages may be automatically generated and sent to: (i) all employees of the company that is offering the job; (ii) a subset of employees of the company that is offering the job (e.g., all employees in a department, all employees in a location, all employees in a region, another defined subset of employees, or any combination thereof); or (iii) specific employees of the company.

In embodiment of the invention, the user obtain a URL (per Step 306, 308) which is associated with a web page (per Step 310). The user may then include the URL in any communication channel of their choosing without necessarily performing (or having the system perform steps 312 and 314.

Figure 3B:
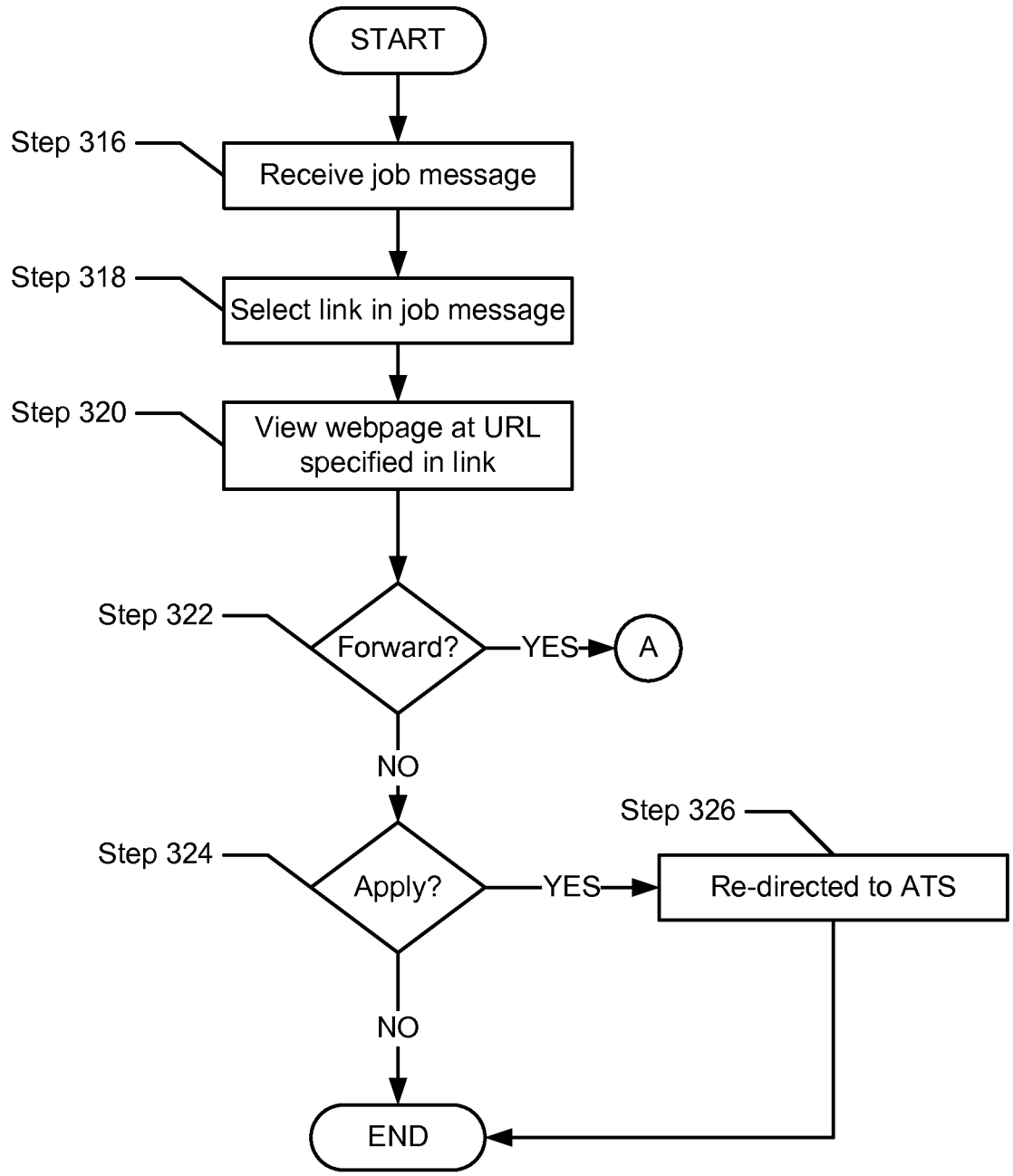

FIG. 3B shows a method for a user interacting with a job message or broadcast job message in accordance with one or more embodiments of the invention. Turning to FIG. 3B, in step 316, a job message or a broadcast job message is received. In the context of job messages, a job message may be considered to be received when it appears, for example, in an inbox of the target. In the context of broadcast job messages, a broadcast job message may be received when the broadcast job message is, for example, posted on a FACEBOOK wall, posted on a blog, or published in a TWITTER feed.

In step 318, the link in the job message or broadcast job message is selected (or clicked) by the target (or another entity that has received the job message or broadcast job message). For example, the intended target may have forwarded the job message or broadcast job message in a manner that is not tracked by the referral tracking system.

In step 320, the web page associated with the URL within the link is presented in the web browser (or another application capable of presenting web pages) for the individual that selected the link to view in Step 318. In one embodiment of the invention, the referral tracking service includes functionality to obtain the web page based on the URL within the link. In one embodiment of the invention, a message view record is created for each user that views the web page. Further, the message view record may be created and/or updated by the job referral service. In one embodiment of the invention, in Step 320, the individual viewing the webpage may also be promoted to create a profile in the source system, where the profile may include information necessary to create a user record (see FIG. 2B). Those skilled in the art will appreciate that the information provided to created the profile may be less information then is shown in FIG. 2B.

In step 322, a determination is made about whether the individual viewing the web page wishes to forward a job message or broadcast job message to a job candidate, a referral-entity, a group of job candidates or referral-entities, or any combination thereof. If the individual viewing the web page wishes to forward a job message or broadcast job message, the process proceeds to Step 302 in FIG. 3A; otherwise the process proceeds to step 324. In one embodiment of the invention, if the individual viewing the web page wishes to forward a job message or broadcast job message, the corresponding message view record is updated to reflect the user's last activity, namely, generating a job message or broadcast job message. The process then precedes to from step 322 to Step 302, and the individual that is forwarding the message may be presented with recommendations for their social network contacts (as described above) and/or presented with employee recommendations (as described above). Those skilled in the art will appreciate that the social network recommendations are based on the social network(s) of the individual that is forwarding the message. Similarly, the employee recommendations are for employees of the individual's company (i.e., the company at which the current individual works).

Figure 3C:
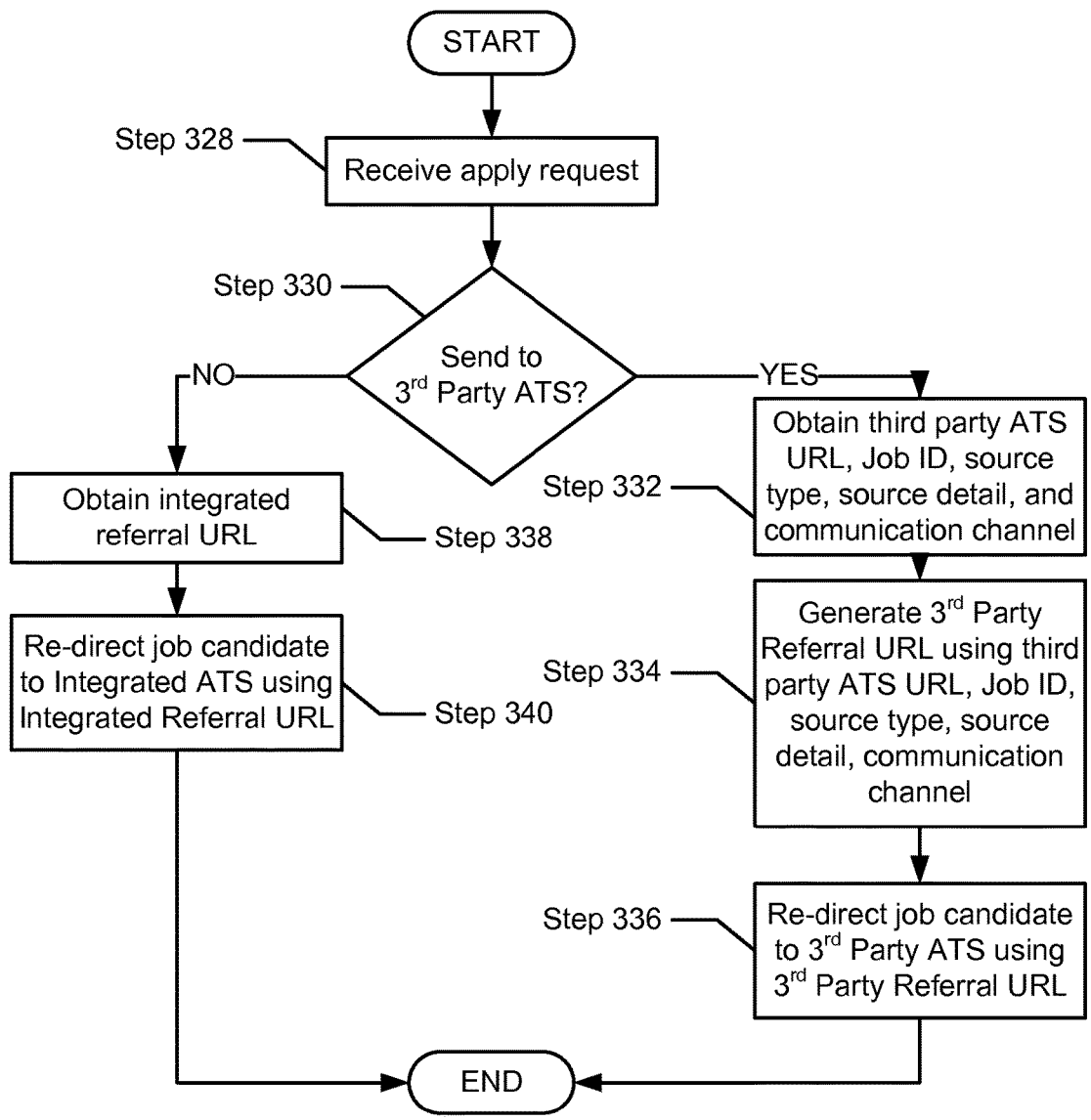

Continuing with FIG. 3C, in step 324, a determination is made about whether the target (or another entity that has received the job message or broadcast job message) has indicated (via selection of a link in web page) that they wish to apply for the job (i.e., the job in the job message or broadcast job message). If so, the process proceeds to step 326; otherwise the process ends. In step 326, the target (or another entity that has received the job message or broadcast job message) is re-directed to the ATS (integrated ATS or third party ATS). Once at the ATS, the target (or another entity that has received the job message or broadcast job message) may apply for the job. Additional details of Step 326 are described in FIG. 3C.

FIG. 3C shows a method for re-directing the target to an ATS in accordance with one or more embodiments of the invention. Turning to FIG. 3C, in Step 328 the source system receives an apply request. More specifically, the source systems receive an indication that a target (or another entity that has received the job message or broadcast job message) has selected the apply link on the webpage displayed in Step 320 above. In one embodiment of the invention, the selection of the apply link triggers the creation of an application record (see FIG. 2H) and the population of the application record with an Application ID, a Job ID, a User ID, and a Source. Other fields in the newly created application record may remain empty until sufficient data is provided by an integrated ATS or a third party ATS.

In Step 330, the source system determines whether the company that posted the job is using an integrated ATS (104 in FIG. 1A) or a third party ATS (102 in FIG. 1A). In one embodiment of the invention, the job record corresponding to the job may include this information. For example, though not shown in FIG. 2D, the job record may include a URL to the web server that is hosting the ATS (e.g., integrated referral URL, or the third Party ATS URL). Those skilled in the art will appreciate that the aforementioned information may be located in another location within the source system or common databases (106) without departing from the invention. If the job candidate is to be re-directed to a third party ATS, the process proceeds to Step 332; otherwise the process proceeds to Step 338.

In Step 332, the third party ATS URL, the job ID, the source type, the source detail, and the communication channel are obtained. More specifically, in one embodiment of the invention, the third party ATS URL may be obtained from the Job Record. Further, the job ID, the source type and source detail may be obtained from the application record (which was created in Step 328) and the communication channel information may be obtained from the corresponding job message record or broadcast job message record that the target (or another entity that has received the job message or broadcast job message) received in Step 316. Those skilled in the art will appreciate that the source type, source detail, and communication channel may be obtained from other records than those listed above without departing from the invention.

In one embodiment of the invention, the source type identifies a referral entity that informs the first target about the job. Examples of referral entities may include, but are not limited to, an employee at the company offering the job, hiring manager at the company offering the job, an agency hired by the company to locate job candidates for the job, an agency hired by the company to advertise the job, a recruiter hired by the company to locate job candidates for the job, a job board used by the company to advertise the job, or other source (which may be used to cover all other source types not covered by the other source type categories). In one embodiment of the invention, the "other source" may be used to cover the scenario described above in which the user obtained a URL (per steps 306, 308) and directly posts the URL at a location of her choice.

In one embodiment of the invention, the source detail identifies instances of the source type. For example, if the source type was an employee, then the source detail may be an employee name or employee ID. In another example, if the source type is a job board, then the source detail may be the name of the job board.

In one embodiment of the invention, the communication channel corresponds to the channel over which the job message or broadcast job message the target (or another entity that has received the job message or broadcast job message) received in Step 316. Examples of communication channels may include but are not limited to, email, FACEBOOK wall post, FACEBOOK status update, FACEBOOK direct message, TWITTER status update, TWITTER direct message, LINKEDIN status update, LINKEDIN direct message, and LINKEDIN group post.

In Step 334, a third party referral URL is generated using the source type, source detail, and communication channel. In one embodiment of the invention, the communication channel is not required to generate the third party referral URL. In such cases, the communication channel is not obtained in Step 332 and is not used in step 334.

The following are two examples of third party referral URLs in accordance with one or more embodiments of the invention. The examples are not intended to limit the invention.

Example 1 http://abccareers.com/
job123.html&stp=employee&sdt1=John+
Smith&jvc=facebook_wall_post.

The third party referral URL in example 1 includes the following information: (i) the third party ATS is located at http://abccareers.com (referred to as the third party ATS URL) (which may be obtained from the corresponding job record); (ii) the job ID is job123; (iii) the source type is employee; (iv) the source detail identifies the employee as John Smith, and (v) the communication channel is a FACEBOOK wall post. From the above information in the URL, the third party ATS can ascertain that John Smith, an employee of the company offering job 123, sent a broadcast job message to FACEBOOK wall post and that the job candidate selected the link in the job message to trigger the method in FIG. 3C.

Example 2 http://abccareers.com/job123.html&stp=job
board&sdt1=Monster

The third party referral URL in example 2 includes the following information: (i) the third party ATS is located at http://abccareers.com (which may be obtained from the corresponding job record); (ii) the job ID is job123; (iii) the source type is a job board; and (iv) the source detail identifies the job board as Monster. From the above information in the URL, the third party ATS can ascertain that a broadcast job message was posted on Monster and that the job candidate selected the link in the job message to trigger the method in FIG. 3C.

As shown in examples 1 and 2 above, the source type, source detail, and communication channel (if required) may be appended to the third party referral URLs. Alternatively, the above information may be included in the third party referral URLs using another format without departing from the invention.

In one embodiment of the invention, the job ID used by the source system is not the same as the job ID used by the third party ATS. In such instances, the source system includes the necessary information to locate the corresponding Job ID used by the third party ATS. For example, the source system may send a request to the third party ATS for the corresponding Job ID. Alternatively, this information may be obtained at the time the job record is created and subsequently stored in the job record for later use.

Though not shown above, those skilled in the art will appreciate that the source system may include any information it tracks about the job and/or job candidate in the third party referral URL.

Continuing with FIG. 3C, in Step 336, the source system sends the third party referral URL to a web browser on a client system that the job candidate is using. In response to receiving the third party referral URL, the web browser re-directs the job candidate to the appropriate web page in the third party ATS.

In Step 338, the integrated referral URL for the integrated ATS is obtained. In one embodiment of the invention, the integrated referral URL is obtained from the job record or the application record. In one embodiment of the invention, the integrated referral URL may be a unique URL that associates the user (i.e., the individual applying for the job) with the job (as identified by the Job ID). The unique URL allows the appropriate records to be created/updated in the common databases in order to track a particular user as they proceed through the application process. Alternatively, the integrated referral URL may include the (i) source type, (ii) source detail, (iii) communication channel, (iv) Job ID, and (iv) user ID (i.e., the ID of the user that is applying for the job identified by the Job ID) in a manner similar to that shown in Examples 1 and 2 above. In Step 340, the source system sends the integrated referral URL to a web browser on a client system that the job candidate is using. In response to receiving the integrated referral URL, the web browser re-directs the job candidate to the appropriate web page in the integrated ATS. The integrated ATS may use the information that is explicitly or implicitly included in the integrated referral URL to directly populate the appropriate records in the common databases.

In one embodiment of the invention, additional code (for example, in the form of JAVASCRIPT®) may be included on the third Party ATS prior to receiving the third Party Referral URL. In response to receiving a request to serve a webpage corresponding to the third Party Referral URL, execution of the additional code is triggered by the third Party ATS. When executed, the additional code may obtain the following information: (i) source type, (ii) source detail, (iii) communication channel, (iv) Job ID, and (iv) user ID (i.e., the ID of the user that is applying for the job identified by the Job ID). Execution of the additional code may include storage of the aforementioned information in the appropriate database, data structure, etc. in the third Party ATS. Those skilled in the art will appreciate that execution of the additional code may result in obtaining and storing different information than what is included about without departing from the invention.

In one embodiment of the invention, the execution of the additional code obtains one or more pieces of information described above by extracting the one or more pieces of information from the third Party Referral URL. Alternatively, in embodiments of the invention in which the third Party ATS includes the additional code, third Party ATS may receive the third Party ATS URL from the source system instead of receiving the third Party Referral URL (e.g., http://abccareers.com/job123. html instead of http://abccareers.com/job123.html&stp=job_board&sdt1=Monster). In such scenarios, the additional code, when executed, may obtain the aforementioned information (e.g., (i) source type, (ii) source detail, (iii) communication channel, (iv) Job ID, and/or (iv) user ID) using other known mechanisms without departing from the invention.

Figure 3D:
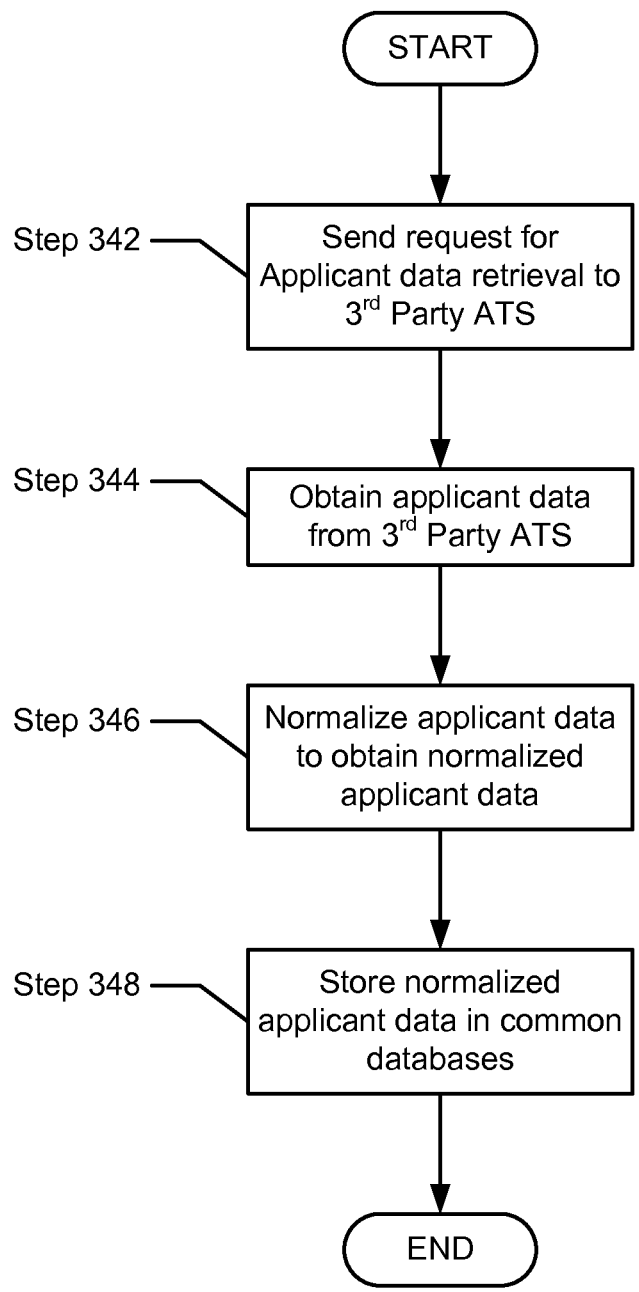

FIG. 3D shows a method for obtaining applicant data from the third party ATS and providing the applicant data to the common databases by the data transfer service in accordance with one or more embodiments of the invention.

In Step 342, the data transfer service sends a request to the third party ATS to obtain applicant data. In one embodiment of the invention, the data transfer service requests applicant data associated with a particular job candidate and/or job. In another embodiment of the invention, the data transfer service requests all applicant data for all job candidates and all jobs for which the third party ATS has applicant data. In one embodiment of the invention, the applicant data corresponds to data used to complete the applicant record, for example, application ID, job ID, User ID, source, rating, and stage. Further, the applicant data may include other information about the applicant that may be used to complete other associated records in the user database. For example, the applicant data may be used to populate (or complete) the education record, work history record, and/or skills record, where this information is obtained by the ATS during the job application process. The applicant data is not limited to the above example.

In Step 344, the third party ATS provides the applicant data to the data transfer service. In one embodiment of the invention, the applicant data is transferred to the data transfer service in a batch process, in which the applicant data for multiple jobs and/or job is obtained in a single transaction. In one embodiment of the invention, the applicant data is obtained from the third party ATS in an eXtensible Mark-up Language (XML) format. Further, the applicant data is transferred to the data transfer service using well known web service protocols.

In step 346, the data transfer service may normalize, as necessary, the applicant data obtained from the third party AST. More specifically, applicant data obtained for the third party ATS may be modified such that it confirms with the requirements of the common databases (106 in FIG. 1B). For example, the third party ATS may represent FACEBOOK as FACEBOOK in the applicant data but the common database represent FACEBOOK as FB. In such cases, all instances of FACEBOOK in the applicant data would be converted to FB. In one embodiment of the invention, the data transfer service includes the necessary information to normalize the applicant data obtained from the third party AST.

In Step 348, once normalized, the normalized application data (or applicant data if normalization is not necessary) is transferred to the appropriate records in the common databases. In one embodiment of the invention, the data transfer service includes the necessary logic to locate the appropriate records to update in the common databases and the necessary permissions to store the applicant data in the appropriate records.

Figure 4C:
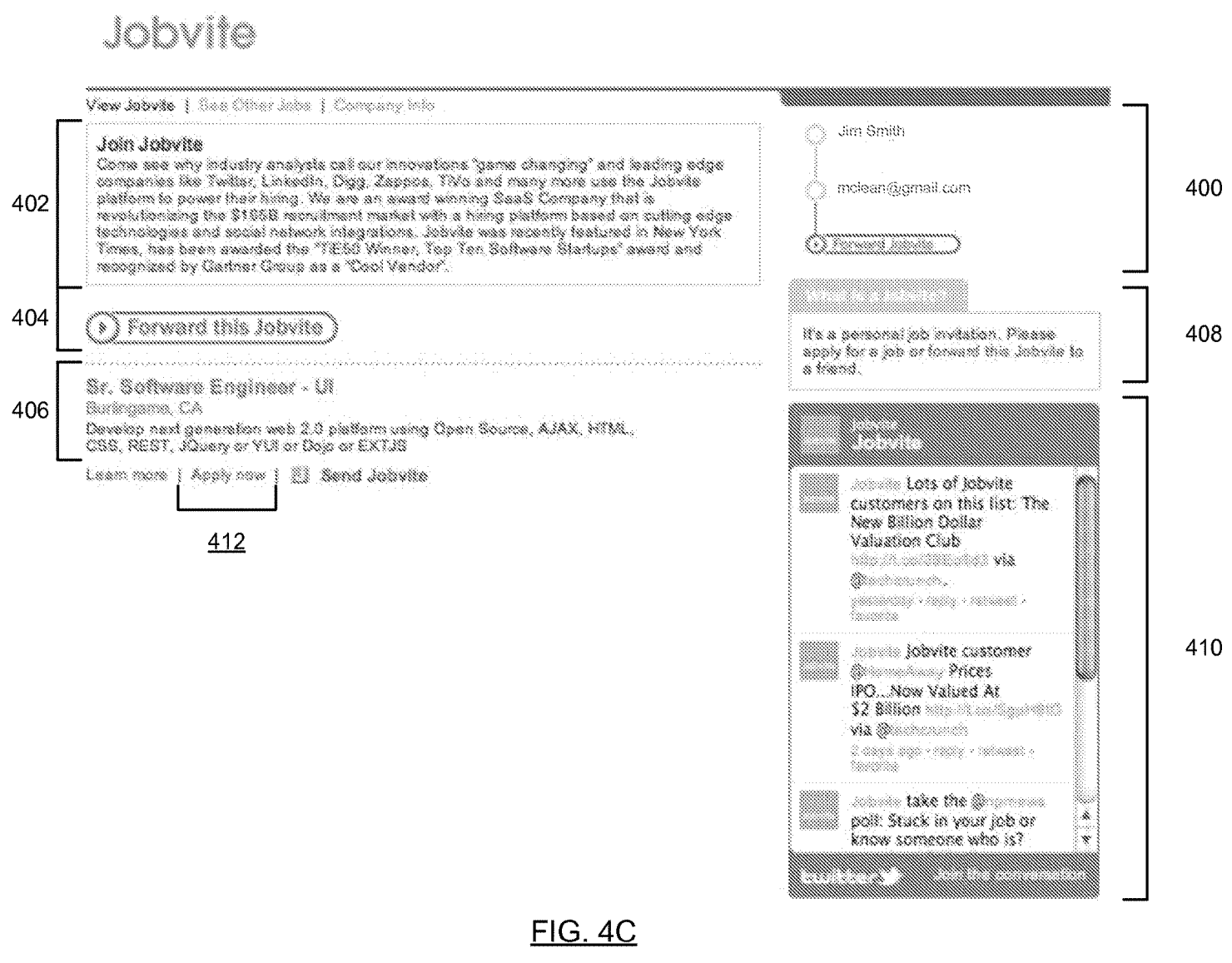

FIGS. 4A-4C show screenshots viewed by users, job candidates, and referral-entities as job messages and job broadcast messages are propagated across various communication channels. As shown in FIGS. 4A-4C, the job message and broadcast job messages may be referred to as Jobvites.

FIG. 4A shows an example of a job message in accordance with one or more embodiments of the invention. The job message identifies: (i) the sender, i.e., Jim Smith, (ii) the date the job message was sent; (iii) the target, i.e., Mary Mclean; (iv) the subject of the job message, i.e., "Jobvite is looking for a Sr. Software Engineer—UI"; (v) a message, i.e., "I thought you'd be interested in this job at Jobvite or know someone who might be good match."; (vi) a link(s) to the web page (see FIG. 4C) when the target selects "Learn more or Jobvite a friend"; (vii) a visual representation of at least part of a job referral path, i.e., Jim Smith>> mary_mclean@gmail.com; and (viii) a description of the job.

FIG. 4B shows a broadcast job message in accordance with one or more embodiments of the invention. More specifically, the broadcast job message is sent via a TWIT- TER status update. The broadcast job message includes: (i) a sender, i.e., adamhyder; (ii) a title of the job, i.e., "Software Engineer; (iii) a message, i.e., "Jobvite is looking for: Software Engineer"; and (iv) a URL to the web page (see e.g., FIG. 4C)

FIG. 4C shows a web page in accordance with one or more embodiments of the invention. The web page corresponds to the web page that is associated with the unique URL (which may be embedded in a link) within the job message (see FIG. 4A). The web page includes: (i) details about the company offering the job (402); (ii) a link to forward the job (404); (iii) detail about the job (406); (iv) a visual representation of the job referral path (400); (v) an explanation of a job message (408); (vi) TWITTER feed (410) associated with the company offering the job; and (vii) a link to apply for the job (412). In one embodiment of the invention, selection of the link to apply for the job (412) triggers the method shown in FIG. 3C.

Those skilled in the art will appreciate that the TWITTER feed may be dynamically updated while Mary Mclean is viewing the web page. In one embodiment of the invention, the visual representation of the job referral path corresponds to the shortest path between the original sender and the target of the job message (or broadcast job message) that is associated with the URL corresponding to the web page. For example, in FIG. 4C, the job referral path shows that the job message was sent from Jim Smith to mclean@gmail.com. This indicates that the shortest path from Jim Smith to mclean@gmail.com is a direct path. However, the job may have been forwarded via two different paths as follows: (i) Jim Smith→Bob Jones→Mary Mclean; and (ii) Jim Smith→Mary Mclean. Accordingly, because there is a direct path between Jim Smith and Mary Mclean, that is what is shown in the job referral path.

Figure 5A:
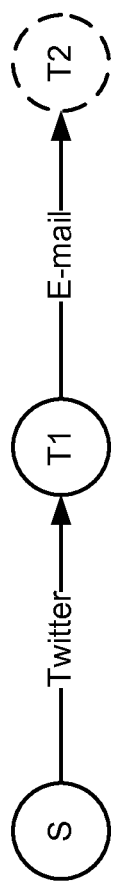
FIGS. 5A-5B show example flow diagrams in accordance with one or more embodiments of the invention.
Figure 5B:
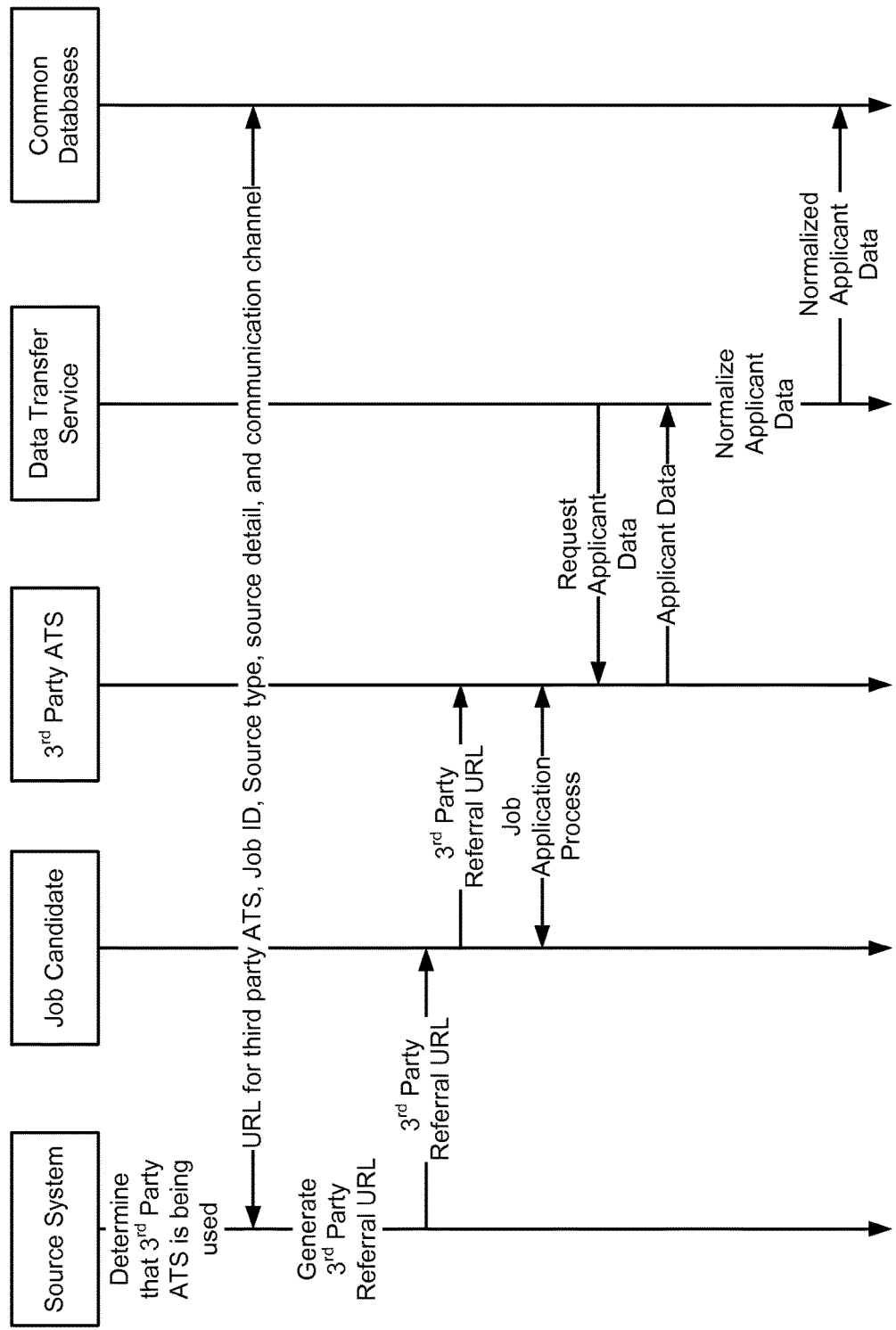

FIGS. 5A-5B show an example in accordance with one or more embodiments of the invention. The example is not intended to limit the scope of the invention. For purposes of this example, "S" refers to a sender and "T[number]" refers to a target.

Turning to the example, Referring to FIG. 4A, S posts a broadcast job message via a TWITTER status update (see e.g., FIG. 4B). T1, which subscribes to S's TWITTER feed selects the URL in the broadcast job message and subsequently views the corresponding web page (see e.g., FIG. 4C). T1, via the web page, "forwards" the job to T2. In this example, forwarding the job message may be initiated via the web page (see e.g., FIG. 4C) using the method shown in FIG. 3A. T2 subsequently receives the job message (via email).

T2, upon receipt of the job message, selects the URL in the job message and is subsequently presented with the corresponding web page (see e.g., FIG. 4C). Those skilled in the art will appreciate that the web page viewed by T1 is different that the web page viewed by T2. Specifically, the job referral path in each of the web pages will be different. Further, each web page will be associated with its own unique URL. Continuing with the example, T2 subsequently selects the link to apply for the job. The selection of the link to apply for the job triggers the method shown in FIG. 3C. The process triggered by the selection of the link to apply for the job is shown in FIG. 5B.

Referring to FIG. 5B, the source system, upon receipt of the request to apply for the job, determines that the company offering the job is using a third party ATS. The source system subsequently requests and receives the URL for the third party ATS, the job ID, the source type, the source detail, and the communication channel from the common databases. In this example, assume that S is an employee of the company offering the job. Accordingly, the source type is an employee, the source detail is "S" (i.e., an identifier associated with the employee) and the communication channel is email.

Once the source system receives the aforementioned information, the source system generates the third party referral URL. The third party referral URL is then provided to the job candidate (or more specifically, the web browser executing on the client system that the job candidate is using). The web browser subsequently re-directs the job candidate to the web site of the third party ATS. The job candidate (via their web browser) and in-person participates in the job application process. The third party ATS tracks the job candidates progress through the job application process. During this process, the third party ATS stores applicant data, as discussed above.

At some later point in time, the data retrieval service sends a request to the third party ATS to obtain the applicant data. The third party ATS subsequently sends applicant to the data transfer service. The data transfer service then normalizes, as necessary, the applicant data to obtain normalized applicant data (or applicant data if no normalization is required). The data transfer service subsequently sends the normalized applicant data (or applicant data if no normalization is required) to the common database. At this point, the source system may access the applicant data (as stored in the relevant records in the common databases) and use this date to identify job candidates, track the effectiveness of various communication channels, etc.

Figure 6:
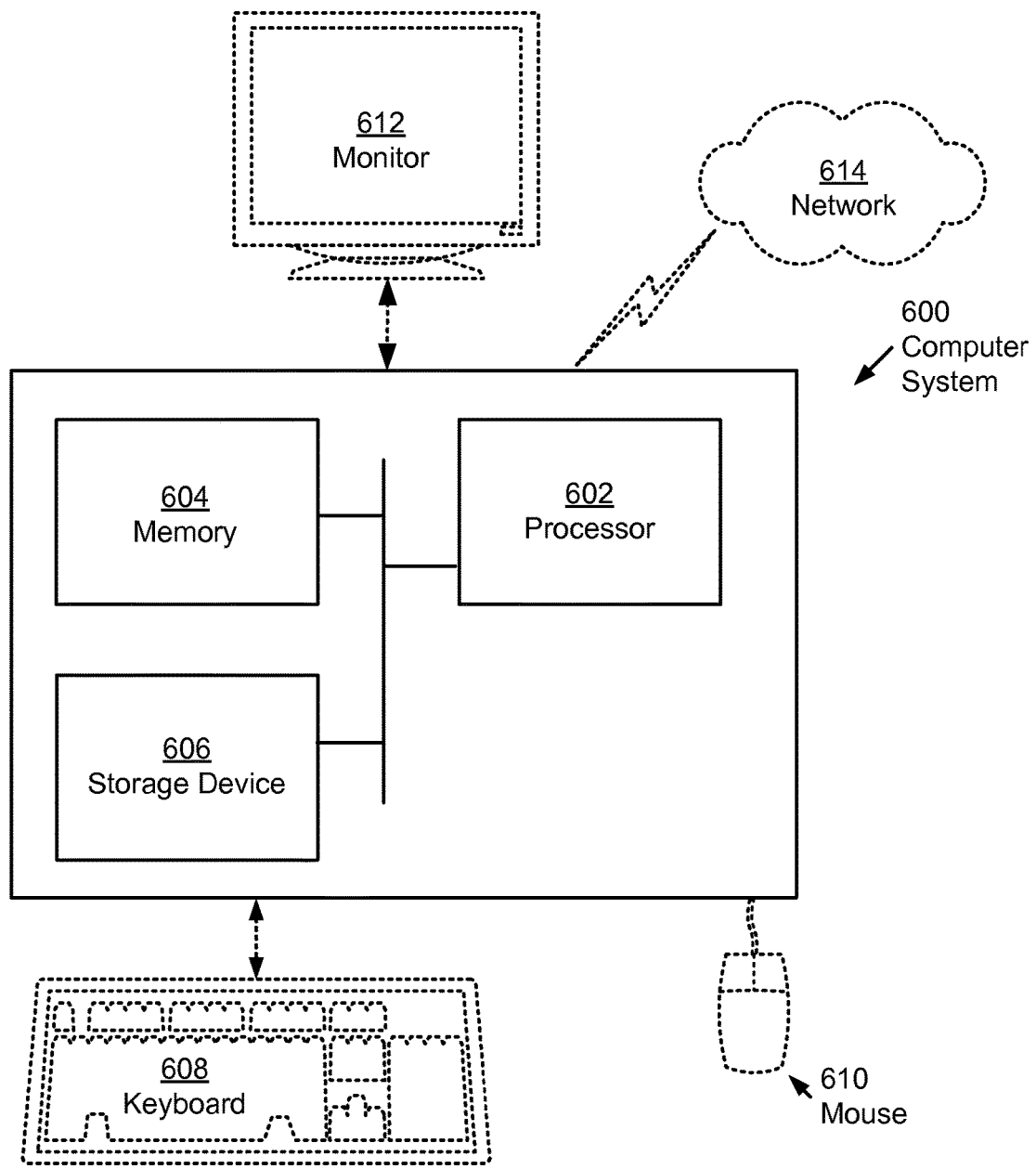
FIG. 6. shows a computer system in accordance with one or more embodiments of the invention.

Embodiments of the invention may be implemented on virtually any type of computer regardless of the platform being used. For example, as shown in FIG. 6, a computer system (600) includes one or more processor(s) (602), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608), a mouse (610), or a microphone (not shown). Further, the computer (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, which when executed by a processor performed a method, the method comprising:

receiving a first request to display a first web page at a first universal resource locator (URL) from a first client system, wherein the first client system is used by a first target, wherein the first URL is associated with a first job at a first company, the first target, and a first communication channel, wherein the first communication channel is a service that provides the first URL to the first target and is one selected from a group consisting of FACEBOOK wall post, FACEBOOK status update, FACEBOOK direct message, TWITTER status update, TWITTER direct message, LINKEDIN status update, LINKEDIN direct message, and LINKEDIN group post, and wherein the first target is a job candidate;

providing to the first client system, in response to the first request, the first web page associated with the first URL, wherein the first web page comprises a description of the first job, and a first link to a first applicant tracking system (ATS), wherein the first ATS is configured to track the first target through a job application process;

receiving, from the first client system, a second request for a web page corresponding to the first job from the first ATS, wherein the second request is initiated by selection of the first link;

making a first determination that the first ATS is a third party ATS;

in response to the first determination:

generating a first third party referral URL, wherein the first third party referral URL comprises a first domain name associated with the first ATS, a first unique identifier associated with the first job, an identifier associated with the first communication channel, a first identifier associated with a first source type, and a first source detail associated with the first source type, wherein the first source type is one selected from a group consisting of an employee of the first company, a hiring manager of the first company, an agency hired by the first company, and a recruiter hired by the first company, wherein the first source detail is an identifier for an entity of the first source type;

providing the first third party referral URL to the first client system;

sending, by a source system, a third request to the first ATS for applicant data associated with the first job, wherein the third request comprises the first unique identifier associated with the first job;

obtaining, in response to the third request, the applicant data from the first ATS, wherein the applicant data comprises data provided by the first target during a job application process for the first job by the first target, data entered by the first company during the job application process, and data extracted from the first third party referral URL comprising the first unique identifier associated with the first job, the first identifier associated with the first source type, and the identifier associated with the first communication channel;

updating, by the source system, a common database using the applicant data obtained from the first ATS; and tracking, in response to updating the common database, a stage of the job application process achieved by the first target, wherein the first target accessed the first URL via the first communication channel;

receiving a fourth request to display a second web page at a second URL from the first client system, wherein the second URL is associated with a second job at a second company, the first target, and the first communication channel;

providing to the first client system, in response to the fourth request, the second web page associated with the second URL, wherein the second web page comprises a description of the second job, and a second link to a second ATS;

receiving from the first client system, a fifth request for a web page corresponding to the second job from the second ATS, wherein the fifth request is initiated by selection of the second link;

making a second determination that the second ATS is an integrated ATS; and in response to the second determination:

generating an integrated referral URL, wherein the integrated referral URL comprises a domain name associated with the second ATS, and a second unique identifier associated with the second job; and providing the integrated referral URL to the first client system.

2. The non-transitory computer readable medium of claim 1, wherein the first client system is one selected from a group consisting of a mobile computing device and a non-mobile computer device.

3. The non-transitory computer readable medium of claim 1, further comprising:

receiving a sixth request to display a third web page at a third URL from a second client system, wherein the second client system is used by a second target, wherein the third URL is associated with a third job at a third company, the second target, and a second communication channel;

providing to the second client system, in response to the sixth request, the third web page associated with the third URL, wherein the third web page comprises a description of the third job, and a third link to a third ATS;

receiving from the second client system a seventh request for a web page corresponding to the third job from the third ATS, wherein the seventh request is initiated by selection of the third link;

making a third determination that the third ATS is a third party ATS; and in response to the third determination:

generating a second third party referral URL, wherein the second third party referral URL comprises a domain name associated with the third ATS, a third unique identifier associated with the third job, an identifier associated with the second communication channel, a third identifier associated with a third source type, wherein the third source type identifies a referral entity that informed the second target about the second job; and providing the second third party referral URL to the second client system.

4. The non-transitory computer readable medium of claim 3, wherein the first communication channel and the second communication channel are different.

5. The non-transitory computer readable medium of claim 1, wherein the first third party referral URL further comprises an identifier associated with a source detail, wherein the source detail identifies a subset of the first source type.

6. The non-transitory computer readable medium of claim 5, wherein the first source type is employee of the company and the source detail is one selected from a group consisting of an employee name and an employee identifier.

7. The non-transitory computer readable medium of claim 1, wherein the first target obtains, via the first client, the first URL from an employee of the first company.

8. A system, comprising:
a processor;
a referral tracking service executing on the processor and configured to:
receive a first request to display a first web page at a first universal resource locator (URL) from a client system, wherein the client system is used by a target, wherein the first URL is associated with a first job at a first company, the target, and a communication channel, wherein the communication channel is a service that provides the URL to the target and is one selected from a group consisting of FACEBOOK wall post, FACEBOOK status update, FACEBOOK direct message, TWITTER status update, TWITTER direct message, LINKEDIN status update, LINKEDIN direct message, and LINKEDIN group post, and wherein the target is a job candidate;
provide to the client system, in response to the first request, the first web page associated with the first URL, wherein the first web page comprises a description of the first job, and a first link to a first applicant tracking system (ATS), wherein the first ATS is configured to track the target through a job application process;
receive, from the client system, a second request for a web page corresponding to the first job from the first ATS, wherein the second request is initiated by selection of the first link;
make a first determination that the first ATS is a third party ATS;
in response to the first determination, send a third request to a URL generation service to generate a third party referral URL;
receive a fourth request to display a second web page at a second URL from the client system, wherein the second URL is associated with a second job at a second company, the target, and the communication channel;
provide to the client system, in response to the fourth request, the second web page associated with the second URL, wherein the second web page comprises a description of the second job, and a second link to a second ATS;
receive from the client system, a fifth request for a web page corresponding to the second job from the second ATS, wherein the fifth request is initiated by selection of the second link;

make a second determination that the second ATS is an integrated ATS; and
in response to the second determination, send a sixth request to the URL generation service to generate an integrated referral URL;
the URL generation service configured to:
receive the third request to generate the third party referral URL;
generate the third party referral URL, wherein the third party referral URL comprises a domain name associated with the first ATS, a first unique identifier associated with the first job, an identifier associated with the communication channel, an identifier associated with a source type, and a source detail associated with the source type, wherein the source type is one selected from a group consisting of an employee of the company, a hiring manager of the company, an agency hired by the company, and a recruiter hired by the company, wherein the source detail is an identifier for an entity of the source type;
provide the third party referral URL to the client system;
receive the sixth request to generate the integrated referral URL;
generate the integrated referral URL, wherein the integrated referral URL comprises a domain name associated with the second ATS, and a second unique identifier associated with the second job; and
provide the integrated referral URL to the client system;
a data transfer service configured to:
send a seventh request to the first ATS for applicant data associated with the first job, wherein the seventh request comprises the first unique identifier associated with the first job;
obtain, in response to the seventh request, the applicant data from the first ATS, wherein the applicant data comprises data entered by the target during a job application process for the first job by the target, data entered by the company during the job application process, and data extracted from the third party referral URL comprising the first unique identifier associated with the first job, the identifier associated with the source type, and the identifier associated with the communication channel;
update and transmit the applicant data to a common database;
track, in response to updating the common database, a stage of the job application process achieved by the target, wherein the target accessed the first URL via the communication channel; and
the database comprising applicant data, wherein the database is accessible to the referral tracking service, the URL referral service, and the data transfer service.

9. The system of claim 8, further comprising:
an integrated ATS, wherein the database is accessible to the integrated ATS and wherein the database is not accessible to the third party ATS.

10. The system of claim 8, wherein the data transfer service obtains the applicant data using a batch process.

11. The system of claim 8, wherein the data transfer service is configured to normalize the applicant data prior to providing the applicant data to the database.

12. The system of claim 8, wherein the third party referral URL further comprises an identifier associated with a source detail, wherein the source detail identifies a subset of the source type.

* * * * *